US012613491B2

(12) United States Patent
Katayama

(10) Patent No.: US 12,613,491 B2
(45) Date of Patent: Apr. 28, 2026

(54) CARTRIDGE

(71) Applicant: CANON KABUSHIKI KAISHA, Tokyo (JP)

(72) Inventor: Koji Katayama, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/940,916

(22) Filed: Nov. 8, 2024

(65) Prior Publication Data

US 2025/0208563 A1 Jun. 26, 2025

(30) Foreign Application Priority Data

Dec. 21, 2023 (JP) ................................ 2023-215671

(51) Int. Cl.

*G03G 21/18* (2006.01)
*G03G 15/00* (2006.01)
*G03G 15/08* (2006.01)

(52) U.S. Cl.

CPC ..... *G03G 21/1842* (2013.01); *G03G 15/0849* (2013.01); *G03G 15/80* (2013.01); *G03G 21/1814* (2013.01); *G03G 21/1867* (2013.01); *G03G 21/1878* (2013.01)

(58) Field of Classification Search

CPC ........... G03G 21/1842; G03G 15/0849; G03G 15/80; G03G 21/1814; G03G 21/1867; G03G 21/1878

See application file for complete search history.

(56) References Cited

U.S. PATENT DOCUMENTS

| | | | | |
|---|---|---|---|---|
| 11,016,440 B2 | 5/2021 | Kawamura et al. | | |
| 2016/0378039 A1* | 12/2016 | Watanabe | .......... | G03G 15/0849 399/30 |
| 2020/0096934 A1* | 3/2020 | Makita | ............... | G03G 15/0849 |

FOREIGN PATENT DOCUMENTS

| | | |
|---|---|---|
| JP | 2020038337 A | 3/2020 |
| JP | 2020144191 A | 9/2020 |
| JP | 2020149043 A | 9/2020 |
| JP | 2022025666 A | 2/2022 |

* cited by examiner

*Primary Examiner* — Sandra Brase

(74) *Attorney, Agent, or Firm* — ROSSI, KIMMS & McDOWELL LLP

(57) ABSTRACT

A cartridge mountable on an image forming apparatus, includes a first unit, and a second unit including a first electrical component, a second electrical component, a first cable portion electrically connected to the first electrical component, a second cable portion electrically connected to the second electrical component, a first member including a first guide portion that guides the first cable portion, and a second member including a second guide portion that guides the second cable portion, the second unit being mountable on the first unit, in which in a state that the second unit is mounted on the first unit, the first member is mounted on a first surface of the first unit, and the second member is mounted on a second surface intersecting the first surface of the first unit.

17 Claims, 17 Drawing Sheets

CARTRIDGE

BACKGROUND OF THE INVENTION

Field of the Invention

The present invention relates to a cartridge mountable on an image forming apparatus.

Description of the Related Art

For a unit (cartridge) replaceably attached to an image forming apparatus, it is required to produce many units in a shorter time. Thus, it is further required to reduce man-hours at the time of unit assembly.

Therefore, a method of simplifying a component configuration of a unit replaceably attached to an image forming apparatus has been proposed (Japanese Patent Application Laid-Open No. 2022-25666). Japanese Patent Application Laid-Open No. 2022-25666 discloses, as a unit that is replaceably attached to an image forming apparatus, a developing unit including an electrical connection portion that is electrically connected to the image forming apparatus, and electrical components such as an inductance sensor and a new product detection sensor. Japanese Patent Application Laid-Open No. 2022-25666 discloses a configuration in which cables from the electrical components such as an inductance sensor and a new product detection sensor are routed on a plurality of surfaces of the developing unit to be integrated into one electrical connection portion.

However, in the case of the configuration disclosed in Japanese Patent Application Laid-Open No. 2022-25666, work is required in which an operator directs a surface on which a cable is routed to the front of the operator during assembly. That is, the work is required in which the operator changes an orientation of the unit that is a heavy object during assembly. Thus, the work of routing the cable on the unit is a burden on the operator, which hinders efficient production at the time of producing the unit.

SUMMARY OF THE INVENTION

It is desirable is to improve assemblability of a cartridge mountable on an image forming apparatus.

A representative configuration of the present invention is a cartridge mountable on an image forming apparatus, including:

a first unit; and a second unit including a first electrical component, a second electrical component, a first cable portion electrically connected to the first electrical component such that power is supplied from the image forming apparatus to the first electrical component, a second cable portion electrically connected to the second electrical component such that power is supplied from the image forming apparatus to the second electrical component, a first member including a first holding portion that holds the first electrical component and a first guide portion that guides the first cable portion, and a second member including a second holding portion that holds the second electrical component and a second guide portion that guides the second cable portion, the second unit being mountable on the first unit, in which in a state that the second unit is mounted on the first unit, the first member is mounted on a first surface of the first unit, and the second member is mounted on a second surface intersecting the first surface of the first unit.

An another representative configuration of the present invention is a cartridge mountable on an image forming apparatus, including:

a first unit; and a second unit including a first electrical component, a second electrical component, a first cable portion electrically connected to the first electrical component such that power is supplied from the image forming apparatus to the first electrical component, a second cable portion electrically connected to the second electrical component such that power is supplied from the image forming apparatus to the second electrical component, a first member including a first holding portion that holds the first electrical component, and a second member including a second holding portion that holds the second electrical component, the second member being relatively movable with respect to the first member, the second unit being mountable on the first unit, in which in a state that the second unit is mounted on the first unit, the first member is mounted on a first surface of the first unit, and the second member is mounted on a second surface intersecting the first surface of the first unit.

Further features of the present invention will become apparent from the following description of exemplary embodiments with reference to the attached drawings.

DESCRIPTION OF THE EMBODIMENTS

Hereinafter, embodiments of the present invention will be exemplarily described in detail with reference to the drawings. Note that dimensions, materials, shapes, relative dispositions, and the like of the components described in the following embodiments should be appropriately changed depending on the configuration of the unit or the device to which the present invention is applied and various conditions, and the scope of the present invention is not intended to be limited only to them. In addition, not all combinations of features described in the embodiments are essential to the solution of the present invention. The present invention can be implemented in various applications such as printers, various printing machines, copying machines, FAX machines, and multifunction peripherals.

First Embodiment (Configuration of Image Forming Apparatus)

Figure 1:
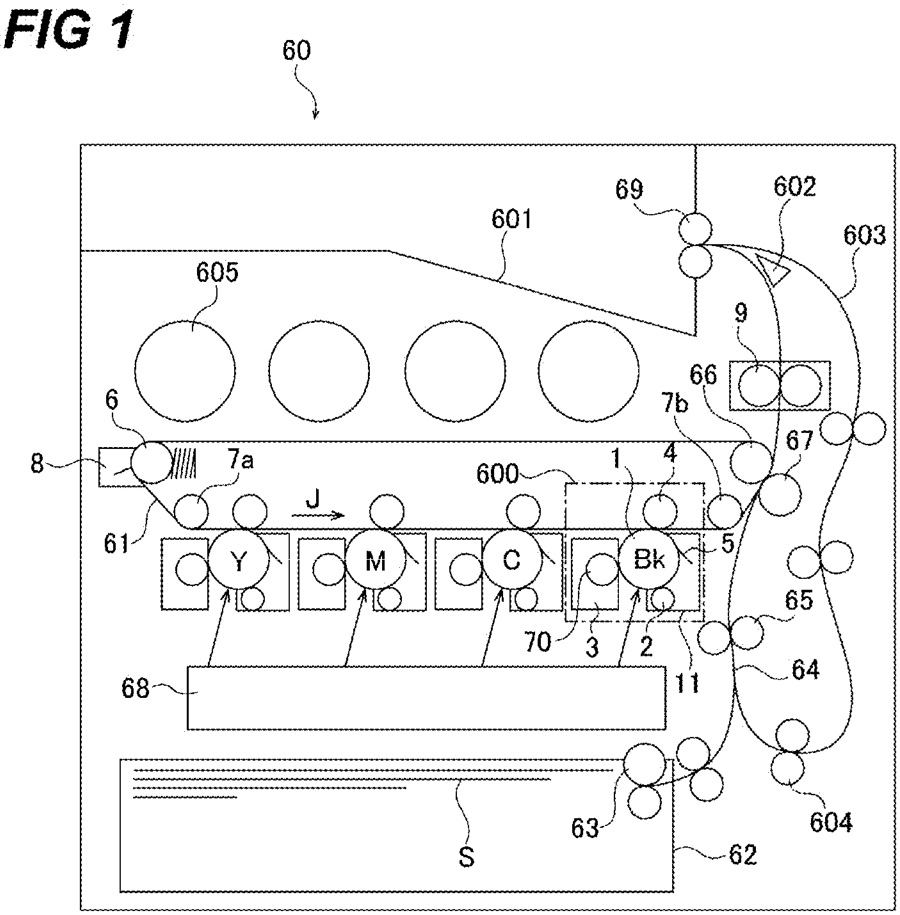
FIG. 1 is a cross-sectional view illustrating a configuration of an image forming apparatus according to a first embodiment.

First, a configuration of an image forming apparatus according to a first embodiment of the present invention will be described with reference to FIG. 1. FIG. 1 is a cross-sectional view illustrating a configuration of an image forming apparatus according to a first embodiment.

As illustrated in FIG. 1, an image forming apparatus 60 includes an endless intermediate transfer belt (ITB) 61 serving as an intermediate transfer member, and four image forming portions 600 from the upstream side to the downstream side in a rotation direction J (arrow direction in FIG. 1) of the intermediate transfer belt 61. The image forming portions 600 form toner images of respective colors of yellow (Y), magenta (M), cyan (C), and black (Bk).

The image forming portion 600 includes a drum unit 11 (image bearing member unit) including a rotatable photosensitive drum 1 serving as an image bearing member. The image forming portion 600 includes a charging roller 2 serving as a charging portion, a developing unit 3 serving as a developing portion, a primary transfer roller 4 serving as a primary transfer portion, and a photosensor cleaner 5 serving as a photosensor cleaning portion, disposed in the rotation direction of the photosensitive drum 1.

Here, the drum unit 11 includes a charging roller 2 and a photosensor cleaner 5 in addition to the photosensitive drum 1, and is detachably attachable to the image forming apparatus 60. In addition, the developing unit 3 includes a developing container 30 that accommodates a two-component developer (hereinafter, simply referred to as a developer) containing nonmagnetic toner (hereinafter, simply referred to as toner) and a magnetic bearing member, and is detachably attachable to the image forming apparatus 60. That is, the drum unit 11 and the developing unit 3 are units detachably attachable to the image forming apparatus 60.

Note that, here, the drum unit 11 and the developing unit 3 are exemplified as units detachably attachable to the image forming apparatus 60, but the units are not limited thereto. A unit detachably attachable to the image forming apparatus 60 may be another unit such as a process cartridge in which a drum unit and a developing unit are integrated.

In addition, a toner cartridge 605 in which toner of each color of yellow (Y), magenta (M), cyan (C), and black (Bk) is accommodated is detachably attachable to the image forming apparatus 60. The toner of each color accommodated in the corresponding toner cartridge 605 is supplied to one developing unit 3 via a toner conveying path.

The intermediate transfer belt 61 is stretched by a tension roller 6, a driven roller 7*a*, a primary transfer roller 4, a driven roller 7*b*, and a secondary transfer inner roller 66, and is conveyed and driven in the rotation direction J illustrated in FIG. 1. The secondary transfer inner roller 66 also serves as a driving roller that drives the intermediate transfer belt 61. As the secondary transfer inner roller 66 is rotated, the intermediate transfer belt 61 is rotated in the rotation direction J.

The intermediate transfer belt 61 is pressed by the primary transfer roller 4 from a back surface side of the intermediate transfer belt 61. Further, by bringing the intermediate transfer belt 61 into contact with the photosensitive drum 1, a primary transfer nip portion serving as a primary transfer portion is formed between the photosensitive drum 1 and the intermediate transfer belt 61. An intermediate transfer member cleaner 8 serving as a belt cleaning portion is in contact with a position facing the tension roller 6 via the intermediate transfer belt 61.

A secondary transfer outer roller 67 serving as a secondary transfer portion is disposed at a position facing the secondary transfer inner roller 66 via the intermediate transfer belt 61. The intermediate transfer belt 61 is nipped between the secondary transfer inner roller 66 and the secondary transfer outer roller 67. As a result, a secondary transfer nip portion serving as a secondary transfer portion is formed between the secondary transfer outer roller 67 and the intermediate transfer belt 61. In the secondary transfer nip portion, a toner image is attracted to the surface of a transfer material S (for example, a sheet or a transparent film) by applying a predetermined pressure and transfer bias (electrostatic load bias).

The transfer material S is stored in a state of being loaded in a transfer material storage portion 62 (for example, a sheet cassette or a sheet deck). A feeding portion 63 feeds the transfer material S according to an image forming timing by using, for example, a friction separation method using a feeding roller or the like. The transfer material S fed by the feeding portion 63 is conveyed to a registration roller 65 disposed in the middle of a conveying path 64. After skew feeding correction or timing correction is performed in the registration roller 65, the transfer material S is conveyed to the secondary transfer nip portion. In the secondary transfer nip portion, the timings of the transfer material S and the toner image coincide with each other, and secondary transfer is performed.

A fixing device 9 is disposed on the downstream side of the secondary transfer nip portion in the conveyance direction of the transfer material S. By applying predetermined pressure and heat from the fixing device 9 to the transfer material S conveyed to the fixing device 9, a toner image is melted and fixed on the surface of the transfer material S. The transfer material S on which the image is fixed as described above is discharged to a discharge tray 601 as it is due to the forward rotation of a discharge roller 69. In a case of performing duplex image formation, the discharge roller 69 is rotated in the reverse direction after the trailing end of the transfer material S has been conveyed until it has passed through a switching flapper 602 due to the forward rotation of the discharge roller 69. As a result, the leading and trailing ends of the transfer material S are replaced, and the transfer material S is conveyed to a duplex conveying path 603. Thereafter, according to the next image forming timing, the transfer material S is conveyed again to the conveying path 64 by a re-feeding roller 604.

(Image Forming Process)

At the time of image formation, the photosensitive drum 1 is rotationally driven by a motor. The charging roller 2 uniformly charges the surface of the photosensitive drum 1 that is rotationally driven in advance. An exposure device 68 forms an electrostatic latent image on the surface of the photosensitive drum 1 charged by the charging roller 2 based on a signal regarding image information input to the image forming apparatus 60. The developing unit 3 (developing device) includes a rotatable developing sleeve 70 serving as a developer bearing member that bears a developer. The developing unit 3 develops the electrostatic latent image formed on the surface of the photosensitive drum 1 by the exposure device 68 by using the developer born on the surface of the developing sleeve 70. As a result, the toner adheres to the exposed portion on the surface of the photosensitive drum 1 and is turned into a visible image. A transfer bias (electrostatic load bias) is applied to the primary transfer roller 4, and the toner image formed on the surface of the photosensitive drum 1 is transferred onto the intermediate transfer belt 61. The toner (transfer residual toner) remaining on the surface of the photosensitive drum 1 after the primary transfer is collected by the photosensor cleaner 5, and preparation for the next image forming process is performed again.

The image forming processes of the respective colors processed in parallel by the image forming portions 600 of the respective colors of Y, M, C, and Bk are performed at the timing at which the toner images of the upstream colors primarily transferred onto the intermediate transfer belt 61 are sequentially superimposed on each other. As a result, a full-color toner image is formed on the intermediate transfer belt 61, and the toner image is conveyed to the secondary transfer nip portion. A transfer bias is applied to the secondary transfer outer roller 67, and the toner image formed on the intermediate transfer belt 61 is transferred to the transfer material S conveyed to the secondary transfer nip portion. The toner (transfer residual toner) remaining on the intermediate transfer belt 61 after the transfer material S passes through the secondary transfer nip portion is collected by the intermediate transfer member cleaner 8. The fixing device 9 fixes the toner image transferred onto the transfer material S. The transfer material S subjected to the fixing process by the fixing device 9 is discharged to the discharge tray 601.

A series of image forming processes as described above is ended, and preparation for the next image forming operation is performed.

(Cyclic Regeneration of Unit)

Conventionally, in an image forming apparatus such as a copying machine, a product that has been used in the market and reached the end of its life or a component constituting the product is collected and disassembled, separated for each material such as resin or metal, and then crushed and melted to be recycled. Efforts have been made to reduce the burden on the environment by effectively utilizing resources as described above.

In recent years, as an effort to reduce the load on the environment, it is required to directly reuse a product that has been used in the market and reached its end of life and components constituting the product, rather than the above-described recycling.

Furthermore, units that respectively perform internal functions are mounted on the image forming apparatus 60. These units are consumables that are detachably attachable to the main body of the image forming apparatus 60, have a shorter life than the main body of the image forming apparatus 60, and are assumed to be periodically replaced. For example, in the image forming apparatus 60, the developing unit 3 and the drum unit 11 are mounted on the image forming apparatus 60 in a detachably attachable manner. The developing unit 3 and the drum unit 11 are examples of units (consumables) that are periodically replaced.

A life of each of the units (consumables) is calculated inside the image forming apparatus 60. When the unit reaches its end of life, the image forming apparatus 60 outputs a message for prompting replacement of the unit via a user interface. In response to this message, a user or a service engineer detaches the unit from the image forming apparatus 60 and replaces the unit with a new unit. The detached unit is collected by the service engineer, then transported to a recycling factory, and only a component that needs to be replaced is replaced and regenerated (hereinafter, referred to as cyclic regeneration).

(Configuration of Developing Unit)

Figure 2:
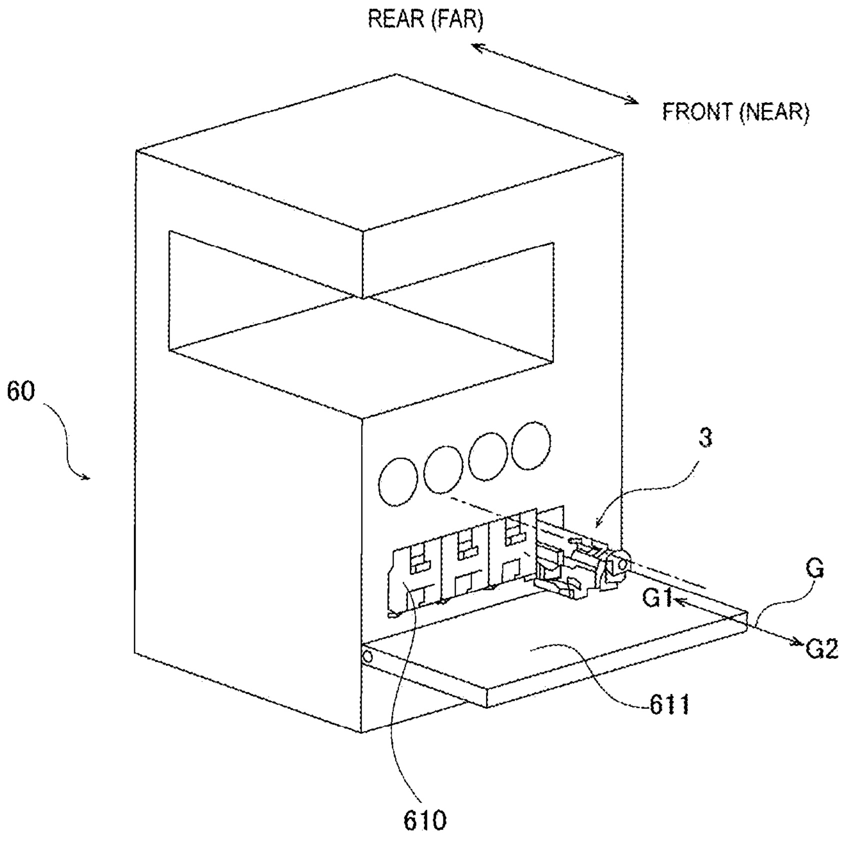
FIG. 2 is a perspective view illustrating a configuration of the image forming apparatus according to the first embodiment.
Figure 3A:
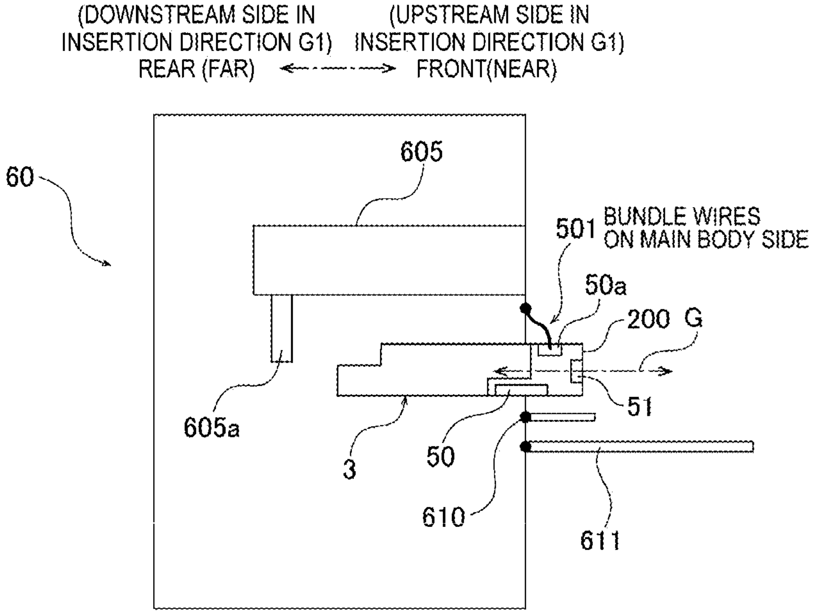
FIGS. 3(*a*) and 3(*b*) are cross-sectional views illustrating a configuration of an image forming apparatus according to the first embodiment.
Figure 3B:
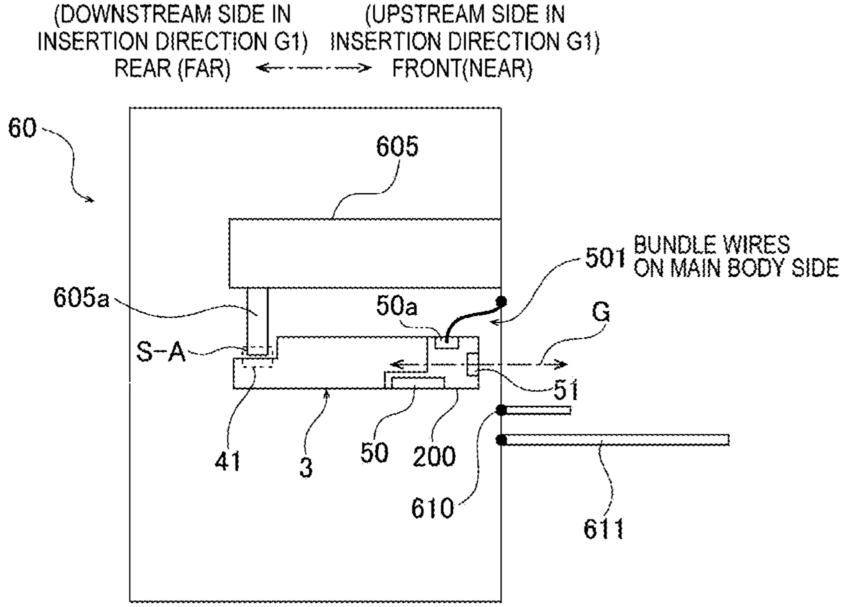

Next, a configuration of the developing unit 3 (developing device) according to the first embodiment will be described with reference to FIGS. 2, 3(*a*), and 3(*b*). FIG. 2 is a perspective view illustrating a configuration of the image forming apparatus according to the first embodiment. FIGS. 3(*a*) and 3(*b*) are cross-sectional views illustrating a configuration of an image forming apparatus according to the first embodiment.

The developing unit 3 is configured as a unit replaceable for the image forming apparatus 60, and is configured to be replaceable independently of the photosensitive drum 1 (drum unit 11). One reason for this is to individually replace the developing unit 3 and the photosensitive drum 1 (drum unit 11) due to a difference in the life of the developing unit 3 and the photosensitive drum 1 to reduce the running cost of the product in the flow accompanying the recent increase in the life of the entire image forming apparatus 60.

The developing unit 3 and the drum unit 11 can be independently replaced. Thus, the image forming apparatus 60 includes a movement mechanism (not illustrated) that moves the developing unit 3 between a developing position and a separated position. The developing position is a position where an electrostatic latent image formed on the photosensitive drum 1 is developed, and the separated position is a position separated from the developing position.

The movement mechanism moves the developing unit 3 between the developing position and the separated position according to opening and closing of an exterior cover 611 of the image forming apparatus 60 and opening and closing of a replacement door 610 of the developing unit 3 or the drum unit 11. The movement mechanism includes an elastic member such as a spring, and the developing unit 3 is pressed against the drum unit 11 by the movement mechanism at a predetermined pressure. The pressure applied by the movement mechanism is set to be a predetermined pressure applied to the drum unit 11 even when a weight of the developing unit 3 or an external force is applied to the developing unit 3. The developing unit 3 is moved between the developing position and the separated position by the movement mechanism, and thus a relative position of the developing unit 3 mounted on the image forming apparatus 60 with respect to the drum unit 11 is determined.

Figure 4:
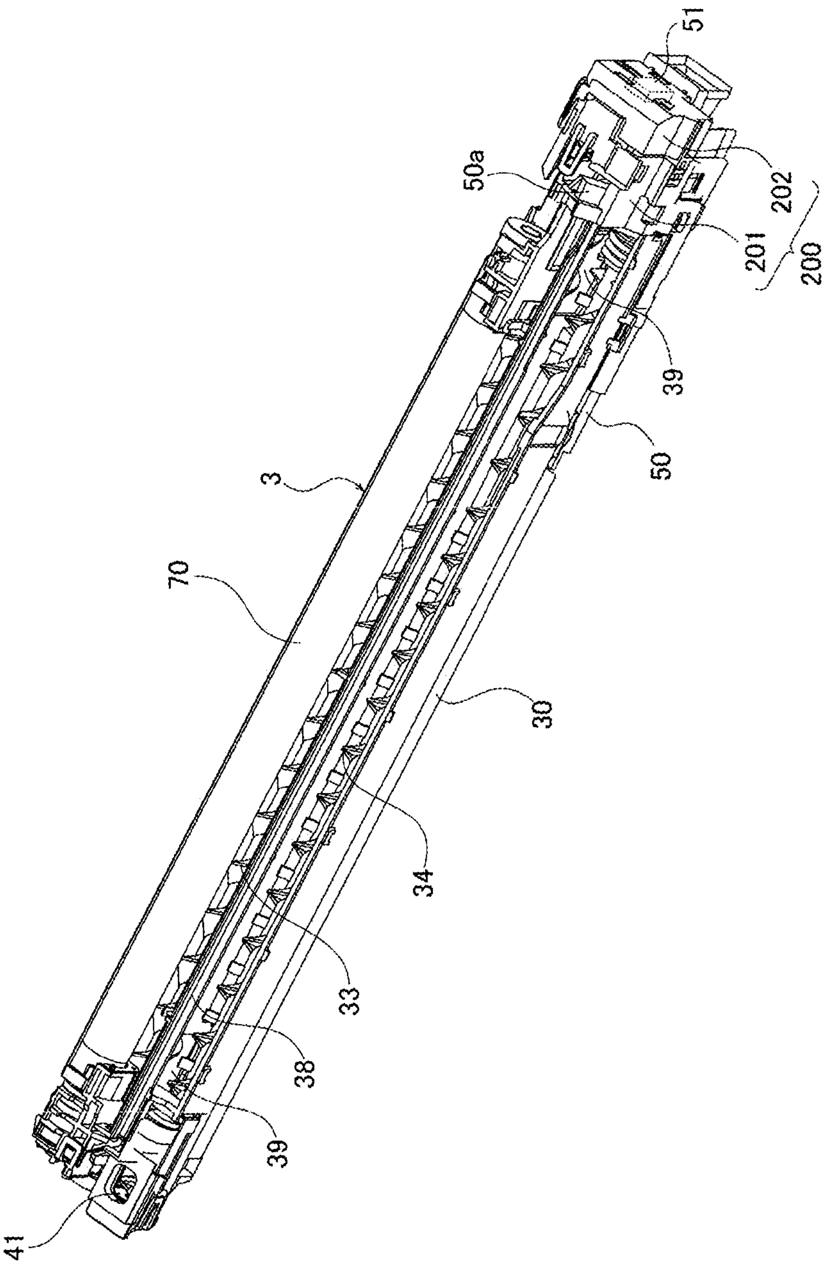
FIG. 4 is a perspective view illustrating a configuration of a developing unit according to the first embodiment.
Figure 5:
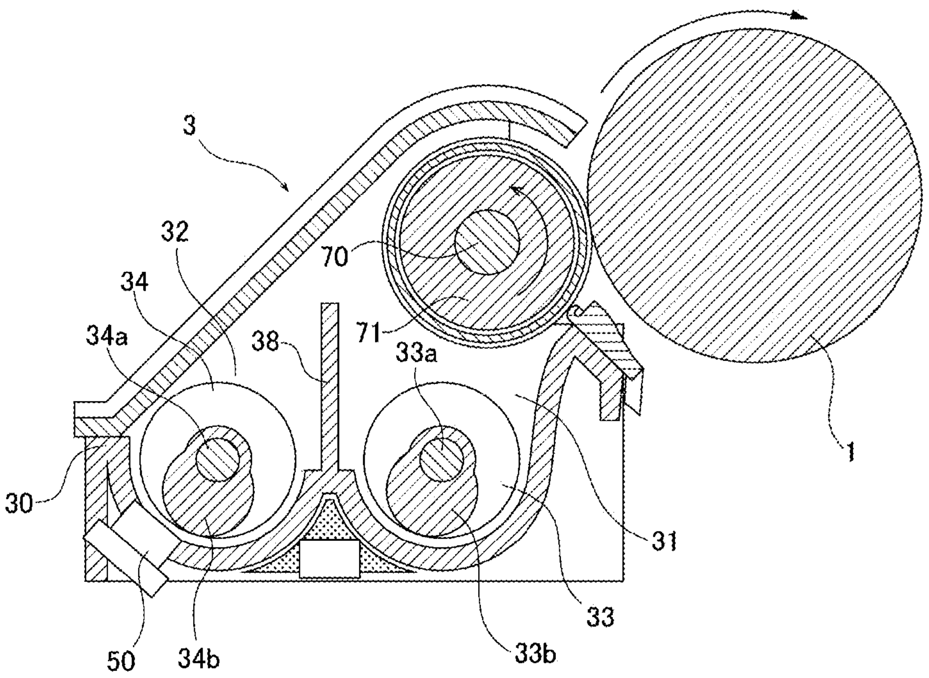
FIG. 5 is a cross-sectional view illustrating a configuration of the developing unit according to the first embodiment.
Figure 6:
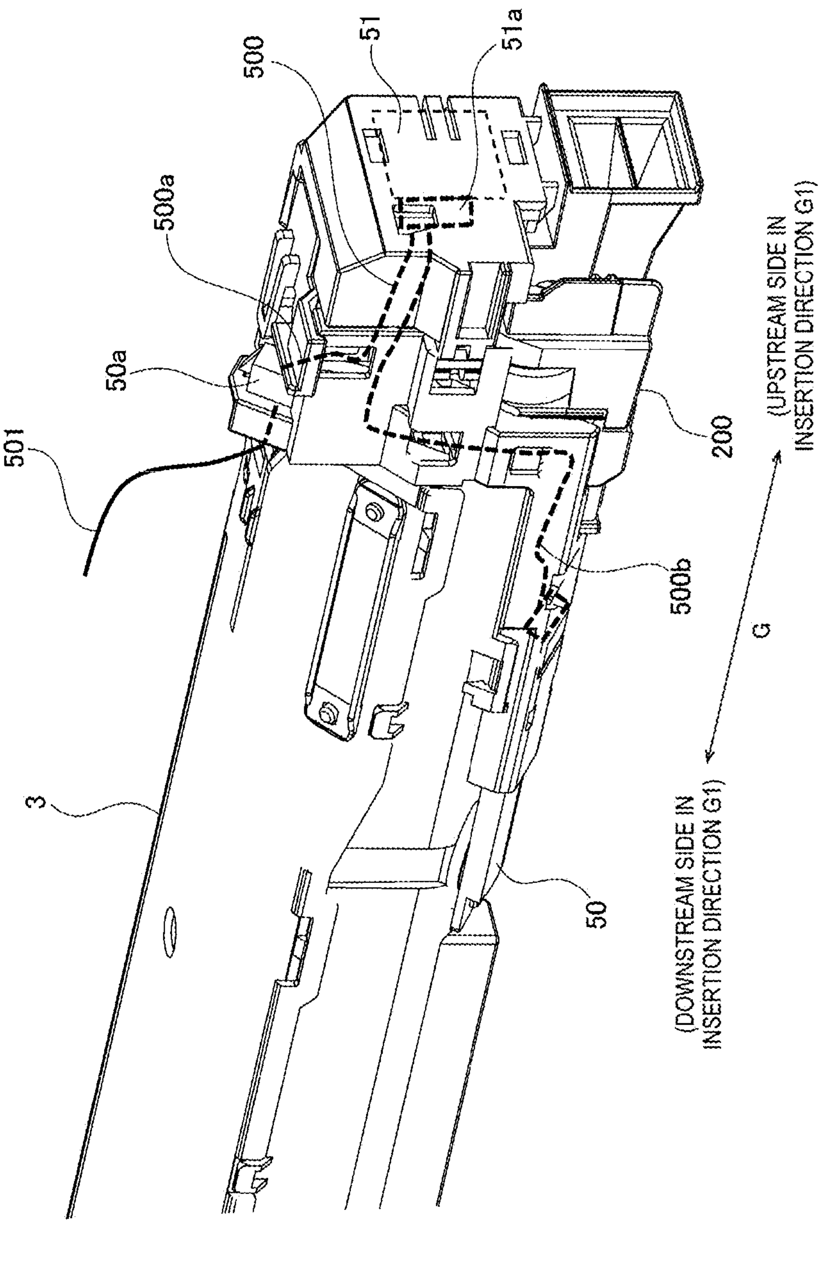
FIG. 6 is a perspective view illustrating a configuration of the developing unit according to the first embodiment.

Further, details of the developing unit 3 will be described with reference to FIGS. 4, 5, and 6. FIG. 4 is a perspective view illustrating a configuration of the developing unit according to the first embodiment. FIG. 5 is a cross-sectional view illustrating a configuration of the developing unit according to the first embodiment. FIG. 6 is a perspective view illustrating a configuration of the developing unit according to the first embodiment.

In the developing unit 3, the inside of the developing container 30 is partitioned into a developing chamber 31 serving as a first chamber and a stirring chamber 32 serving as a second chamber by a partition wall 38 extending in the vertical direction. The developing chamber 31 and the stirring chamber 32 are connected at both ends in the longitudinal direction via two communication portions 39 of the partition wall 38. Therefore, the developer can communicate between the developing chamber 31 and the stirring chamber 32 via the communication portions 39. The developing chamber 31 and the stirring chamber 32 are disposed side by side on the left and right in the horizontal direction. In the present embodiment, the partition wall 38 is integrally formed with the developing container 30, but may be attached separately.

The developing container 30 is provided with an opening at a position corresponding to a developing region where the developing sleeve 70 faces the photosensitive drum 1. The developing sleeve 70 is rotatably disposed with respect to the developing container 30 such that a part of the developing sleeve 70 is exposed at the opening of the developing container 30. Inside the developing sleeve 70, a magnet roll 71 is fixedly disposed as a magnetic field generation portion that has a plurality of magnetic poles in the rotation direction of the developing sleeve 70 and generates a magnetic field for bearing the developer on the surface of the developing sleeve 70. The developer in the developing chamber 31 is pumped up by the influence of the magnetic field due to the magnetic poles of the magnet roll 71 and supplied to the developing sleeve 70. Since the developer is supplied from the developing chamber 31 to the developing sleeve 70 as described above, the developing chamber 31 will also be referred to as a supply chamber.

In the developing chamber 31, a first conveying screw 33 serving as a conveying portion that stirs and conveys the developer in the developing chamber 31 is disposed to face the developing sleeve 70. The first conveying screw 33 includes a rotating shaft 33*a* serving as a rotatable shaft portion and a spiral blade portion 33*b* serving as a developer conveying portion provided along the outer periphery of the rotating shaft 33*a*, and is rotatably supported with respect to the developing container 30. A bearing member (not illustrated) is provided at each of both ends of the rotating shaft 33*a*.

In the stirring chamber 32, a second conveying screw 34 serving as a conveying portion that stirs the developer in the stirring chamber 32 and conveys the developer in a direction opposite to the direction of the first conveying screw 33 is disposed. The second conveying screw 34 includes a rotating shaft 34*a* serving as a rotatable shaft portion and a spiral blade portion 34*b* serving as a developer conveying portion provided along the outer periphery of the rotating shaft 34*a*, and is rotatably supported with respect to the developing container 30. A bearing member is provided at each of both ends of the rotating shaft 34*a*.

When the first conveying screw 33 and the second conveying screw 34 are rotationally driven, the developer circulates between the developing chamber 31 and the stirring chamber 32 via the communication portion 39.

Next, an insertion/extraction direction G of the developing unit 3 (developing device) for the image forming apparatus 60 and disposition of a toner supply port 41 will be described with reference to FIGS. 3(*a*), 3(*b*), and 4. An insertion direction of the developing unit 3 is indicated by G1, and an extraction direction is indicated by G2.

The developing unit 3 needs to supplement the toner consumed due to development in the developing unit 3. A toner conveying path 605*a* provided in the image forming apparatus 60 and the toner supply port 41 of the developing unit 3 are separated or coupled when the developing unit 3 is inserted into or extracted from the image forming apparatus 60. In this case, since not a little toner scatters from a joint S-A between the toner conveying path 605*a* and the toner supply port 41, the joint S-A is preferably provided on the far side of the image forming apparatus 60 (the downstream side in the insertion direction G1 of the developing unit 3).

(Electrical Components of Developing Unit)

The developing unit 3 includes electrical components controlled by a controller (not illustrated) provided in the image forming apparatus 60. Here, as the electrical components, an inductance sensor 50 that detects a toner density inside the developing unit 3 and a storage device 51 that stores information regarding the developing unit are exemplified.

(Inductance Sensor)

Next, disposition of the inductance sensor 50 provided in the developing unit 3 will be described with reference to FIGS. 4, 5, and 6.

Since the toner supplied from the toner supply port 41 to the developing unit 3 needs to be sufficiently stirred and mixed with the magnetic bearing member, the toner is stirred by stirring members or the like (a screw 33 and a screw 34) provided in the developing unit 3. A ratio between the stirred toner and the magnetic bearing member is measured by the inductance sensor 50 (toner density detection sensor), an amount of toner density in the developing unit 3 is determined, and the necessity of toner supply is determined.

Thus, if the toner and the magnetic bearing member are not sufficiently mixed, the toner density is uneven, and it is difficult to correctly measure the toner density. For this reason, it is necessary to sufficiently stir the toner supplied from the toner supply port 41 with the magnetic bearing member. Therefore, the inductance sensor 50 is preferably disposed at a position as far as possible from the toner supply port 41. Since the toner supply port 41 is disposed on the rear side of the developing unit 3 (the downstream side in the insertion direction G1), the inductance sensor 50 is disposed near the front side of the developing unit 3 (the upstream side in the insertion direction G1). Here, the insertion direction G1 is a mounting direction of the developing unit 3 for the image forming apparatus 60.

However, when the inductance sensor 50 is disposed in the vicinity of a region where the developer is pumped up in the developing sleeve 70, the toner density is not uniform due to toner consumption or the like. Thus, the inductance sensor 50 is appropriately disposed at a position as far as possible from the toner supply port 41 and immediately before the developer is pumped up to the developing sleeve 70. Specifically, the inductance sensor 50 is disposed on the screw 34 side in the developing unit 3.

Furthermore, in order to determine the toner density in the developing unit 3, it is necessary to dispose the inductance sensor 50 on the lower side in the direction of gravity with respect to the toner powder surface accommodated in the developing unit 3, and thus, the inductance sensor 50 is disposed on the lower surface of the developing unit 3.

That is, the inductance sensor 50 is disposed near the front side of the developing unit 3 (the upstream side in the insertion direction G1), on the screw 34 side of the developing unit 3, and on the lower surface of the developing unit 3.

(Storage Device)

Next, the storage device 51 in which information regarding the developing unit 3 is written will be described with reference to FIG. 6. Here, as information regarding the developing unit 3, information regarding whether or not the developing unit 3 mounted on the image forming apparatus 60 is a new product or individual information of the developing unit 3 is exemplified. However, the information regarding the developing unit 3 written in the storage device 51 is not limited thereto, and may be other operation information, setting values, or the like of the unit.

The developing unit 3 performs calibration of the inductance sensor 50 (an initialization operation of the developing unit) based on the toner density at the time of manufacturing. That is, when the developing unit 3 is mounted on the image forming apparatus 60, a controller (CPU) (not illustrated) provided in the image forming apparatus 60 detects (determines) whether or not the developing unit 3 mounted on the image forming apparatus 60 is a new product from the information written in the storage device 51. In a case where the controller (CPU) of the image forming apparatus 60 determines that the mounted developing unit 3 is a new product from the information written in the storage device 51, the controller automatically performs calibration of the inductance sensor 50 (an initialization operation of the developing unit). Note that the storage device 51 may be any device as long as it can be detected that the developing unit 3 has been replaced, and a storage portion may be a storage function (memory) or may be in a fuse form.

(Electrical Connection Between Inductance Sensor and Storage Device in Developing Unit)

Next, electrical connection between the inductance sensor 50 and the storage device 51 provided in the developing unit 3 will be described.

The image forming apparatus 60 according to the present embodiment includes a controller (not illustrated) including a CPU or the like that controls power and signals for electrical components of various units. The developing unit 3 that is detachably attachable to the image forming apparatus 60 includes an electrical connection portion electrically connected to the image forming apparatus 60. Here, the developing unit 3 includes a connector 50*a* serving as an electrical connection portion supplying power to and communicating with the inductance sensor 50 and the storage device 51 provided in the developing unit 3, and used for connection to a cable 501 on the image forming apparatus 60 side.

Here, the connector is exemplified as the electrical connection portion included in the developing unit, but the present invention is not limited thereto, and another electrical connection portion such as an electrical contact may be used.

The developing unit 3 according to the present embodiment includes a cable 500 that electrically connects the connector 50*a*, the inductance sensor 50, and the storage device 51. The cable 500 includes a cable 500*a* electrically connected to the connector 50*a* and a connector 51*a* of the storage device 51, and a cable 500*b* electrically connected to the inductance sensor 50 and the connector 51*a* of the storage device 51.

In the present embodiment, a connector (not illustrated) serving as an electrical connection portion is also provided in the cable 501 on the image forming apparatus 60 side. The connector (not illustrated) of the cable 501 on the image forming apparatus 60 side and the connector 50*a* on the developing unit 3 side have a male-female relationship. For example, in a case where the connector (not illustrated) on the image forming apparatus 60 side has a male shape, the connector 50*a* on the developing unit 3 side has a female shape. Alternatively, in a case where the connector (not illustrated) on the image forming apparatus 60 side has a female shape, the connector 50*a* on the developing unit 3 side has a male shape.

The connector 50*a* on the developing unit 3 side is preferably disposed on the upstream side in the insertion direction G1. This is because when the connector 50*a* on the developing unit 3 side is disposed on the upstream side in the insertion direction G1, an electrical path from the inductance sensor 50 to the connector 50*a* is shorter than when the connector is disposed on the downstream side in the insertion direction G1.

In addition, the connector (electrical connection portion) on the image forming apparatus 60 side is electrically connected to the controller (not illustrated) of the image forming apparatus 60 via the cable 501. In the insertion/extraction direction G of the image forming apparatus 60, it is assumed that the connector 50*a* on the developing unit 3 side is located on the far side (the downstream side in the insertion direction G1). In this case, first, when the developing unit 3 is inserted into (mounted on) the image forming apparatus 60, the connector on the image forming apparatus 60 side and the connector 50*a* on the developing unit 3 side are electrically connected on the near side of the image forming apparatus 60 (the upstream side in the insertion direction G1). Thereafter, it is necessary to further insert the developing unit 3 in the insertion direction G1 until the developing unit 3 is mounted on the image forming apparatus 60. In this case, a free length of the cable 501 connecting the controller of the image forming apparatus 60 and the connector on the image forming apparatus 60 side needs to be increased so that an electrical connection state between the connector on the image forming apparatus 60 side and the connector 50*a* on the developing unit 3 side is maintained. Therefore, it is difficult to process and store an extra length of the cable 501 (electrical bundle wires) in the image forming apparatus 60.

Therefore, in the present embodiment, the connector 50*a* on the developing unit 3 side is disposed on the near side of the image forming apparatus 60 (the upstream side in the insertion direction G1) in the insertion/extraction direction G. The developing unit 3 is inserted into the image forming apparatus 60, and immediately before the developing unit 3 is mounted on the image forming apparatus 60, the connector on the image forming apparatus 60 side and the connector 50*a* on the developing unit 3 side may be connected on the near side of the image forming apparatus 60 (the upstream side in the insertion direction G1). As a result, it is possible to reduce a risk that it is difficult to process and store an extra length of the cable 501 (electrical bundle wires) in the image forming apparatus 60.

Therefore, as illustrated in FIGS. 3(*a*) and 3(*b*), it is preferable that the developing unit 3 is inserted into the image forming apparatus 60, and the connector on the image forming apparatus 60 side and the connector 50*a* on the developing unit 3 side are connected immediately before the developing unit 3 is mounted on the image forming apparatus 60. In this case, since the developing unit 3 is looked down from above as a point of view of a service engineer, it is preferable in terms of work that the connector 50*a* on the developing unit 3 side is located on the upper surface side of the developing unit 3.

As described above, since the inductance sensor 50 is disposed on the upstream side in the insertion direction G1, the connector 50*a* is disposed on the upper surface on the upstream side in the insertion direction G1. In addition, the storage device 51 is preferably disposed on the upstream side in the insertion direction G1 from the viewpoint of the electrical path from the connector 50*a*. This is preferable from the viewpoint of the downsizing of the developing unit 3 and the risk of failure of the electrical path without complicating the routing of the cable 500. In addition, since a service engineer accesses the connector 50*a* on the upper surface on the upstream side in the insertion direction G1, it is preferable to provide a certain space around the connector 50*a*.

Thus, the storage device 51 is disposed on the unit front surface orthogonal to the insertion direction G1 on the upstream side in the insertion direction G1, which is a position closest to the connector 50*a* at the position avoiding the space.

The cable 500 is branched into the cable 500*a* connected to the connector 50*a* and the cable 500*b* connected to the inductance sensor 50 with a connector connected to the connector 51*a* of the storage device 51 as a starting point. In this case, each of the cables 500*a* and 500*b* is a set line of a plurality of lines of earth, power, signals, and the like to an electrical component.

For the above-described reasons, the connector 50*a* is disposed on the unit upper surface, the storage device 51 is disposed on the unit front surface orthogonal to the insertion direction G1 on the upstream side in the insertion direction G1, and the inductance sensor 50 is disposed on the unit lower surface. Therefore, the disposition surfaces cannot be aligned.

In contrast to the above-described disposition of the connector 50*a*, the storage device 51, and the inductance sensor 50, the cable 500 is conventionally routed on a plurality of surfaces in the unit in order to route the cable 500 on the unit surface.

In such a configuration, an operator changes the orientation of the unit during assembly in order to direct the surface on which the cable 500 is routed to the front of the operator.

When the orientation of the unit is changed during assembly, work of changing the orientation of the unit that is a heavy object is a burden, and efficient production is hindered at the time of producing a new product and a regenerated product of the unit. In addition, there is a risk that the unit is damaged by hitting a component such as a developing sleeve delicate for a scratch or a dent while changing the orientation of the unit.

In order to avoid these risks, the process at the time of assembly is complicated, and a load is large in the case of a unit such as a consumable unit with a large number of products. In addition, the fact that the assembly process is complicated indicates that the process at the time of disassembly is also complicated, and thus, a load is large even in the cyclic regeneration in which a unit is collected and only some components are replaced and reused.

Therefore, as illustrated in FIG. 6, the developing unit 3 according to the present embodiment includes a subunit 200 in which the connector 50*a*, the inductance sensor 50, the storage device 51, the cable 500, and a cable guide holding the constituents are integrated. By assembling the subunit 200 to the developing unit 3 at the end of the assembling process, it is possible to eliminate the work of directly routing the cable 500 on the developing unit 3 and to reduce the risks described above.

(Subunit)

Figure 7A:
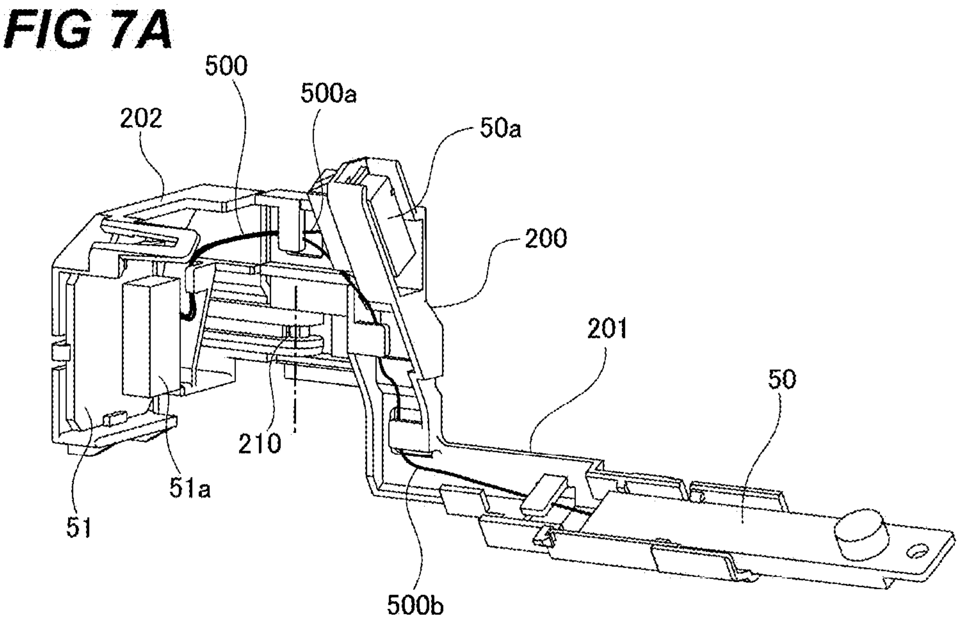
FIGS. 7(*a*) and 7(*b*) are perspective views illustrating a configuration of a subunit according to the first embodiment.
Figure 7B:
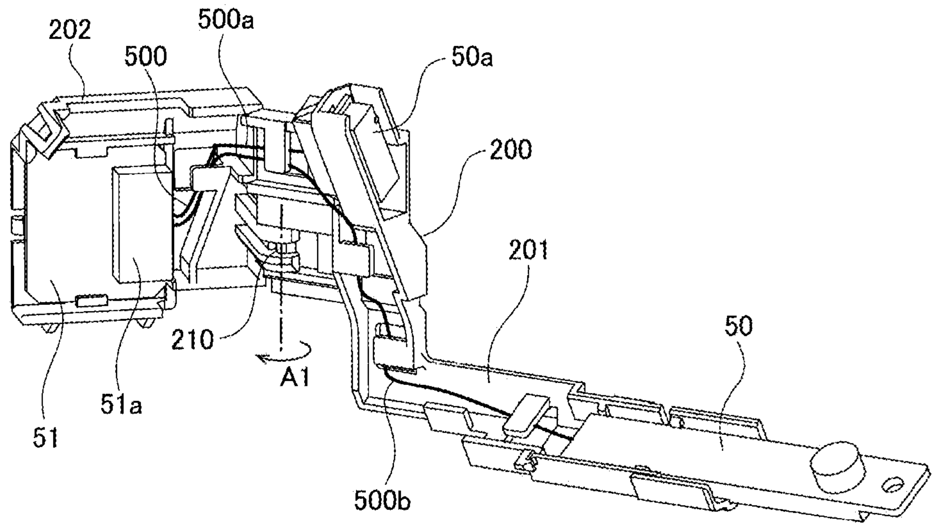

Next, a configuration of the subunit 200 will be described with reference to FIGS. 7(*a*) and 7(*b*). FIGS. 7(*a*) and 7(*b*) are perspective views illustrating a configuration of the subunit according to the first embodiment.

The subunit 200 holds the connector 50*a*, the inductance sensor 50, the storage device 51, and the cable 500, and is attached to the developing unit 3.

The connector 50*a* is an electrical connection portion electrically connected to the image forming apparatus 60. The inductance sensor 50 and the storage device 51 are electrical components controlled by a controller (not illustrated) provided in the image forming apparatus 60. That is, the electrical components include the inductance sensor 50 serving as a first electrical component controlled by the controller, and the storage device 51 serving as a second electrical component controlled by the controller. The cable 500 is a cable that electrically connects the connector 50*a*, the inductance sensor 50, and the storage device 51.

The subunit 200 includes a first cable guide 201 that holds the inductance sensor 50 and the cable 500, and a second cable guide 202 that holds the storage device 51 and the cable 500 and is provided to be relatively movable with respect to the first cable guide 201.

In other words, the inductance sensor 50 and the connector 50*a* are attached to the first cable guide 201, and the storage device 51 is attached to the second cable guide 202. The cable 500 is connected to the connector 50*a*, the inductance sensor 50, and the storage device 51, and is thus attached across the cable guide 201 and the cable guide 202.

The first cable guide 201 and the second cable guide 202 are pivotally supported by the shaft portion 210 and are configured to be relatively movable with respect to each other. That is, the second cable guide 202 and the first cable guide 201 are rotatably supported by the shaft portion 210. Since the first cable guide 201 and the second cable guide 202 are relatively movably engaged, the subunit 200 can be directly attached to the developing unit 3.

Therefore, the subunit 200 according to the present embodiment includes the connector 50*a*, the inductance sensor 50, the storage device 51, the cable 500, the cable guide 201, and the cable guide 202.

Details of the subunit 200 will be described with reference to FIG. 7(*a*).

As described above, the inductance sensor 50 is attached to the first cable guide 201. When the first cable guide 201 (subunit 200) is attached to the developing unit 3, the inductance sensor 50 is disposed on the lower surface (first surface) of the developing unit 3 on the upstream side in the insertion direction G1.

The connector 50*a* is attached to the first cable guide 201. Since the first cable guide 201 (subunit 200) is attached to the developing unit 3, the connector 50*a* is disposed on the upper surface (first surface) of the developing unit 3 on the upstream side in the insertion direction G1.

The storage device 51 is attached to the second cable guide 202. Since the second cable guide 202 (subunit 200) is attached to the developing unit 3, the storage device 51 is disposed on the front surface (a second surface different from the first surface) of the developing unit 3 on the upstream side in the insertion direction G1.

In a case where the cable 500 is directly attached to the developing unit 3 without passing through the subunit 200, the cable 500 is routed on a plurality of surfaces of the developing unit 3 in order to connect the inductance sensor 50, the connector 50*a*, and the storage device 51 that are present on different surfaces. That is, the cable 500 is routed on the lower surface, the front surface, and the upper surface of the developing unit 3.

Therefore, the inductance sensor 50 and the connector 50*a* are disposed in the first cable guide 201, and the storage device 51 is disposed in the second cable guide 202. Further, the cable 500 connecting the inductance sensor 50, the connector 50*a*, and the storage device 51 is assembled to the first cable guide 201 and the second cable guide 202. Here, when the subunit 200 is assembled, the second cable guide 202 is rotated in a rotation direction A1 with respect to the first cable guide 201 about the shaft portion 210 as illustrated in FIG. 7(*b*). As a result, the cable 500 can be routed without changing an orientation of the subunit 200 in order to direct the surface on which the cable 500 is routed to the front of an operator.

In addition, the first cable guide 201 and the second cable guide 202 are pivotally supported by the shaft portion 210. As a result, when an assembly operator carries the subunit 200 after assembling the subunit 200, damage to the cable 500 can be prevented even in a state that only one side of the cable guide is gripped, and a risk such as disconnection can be reduced.

Figure 8:
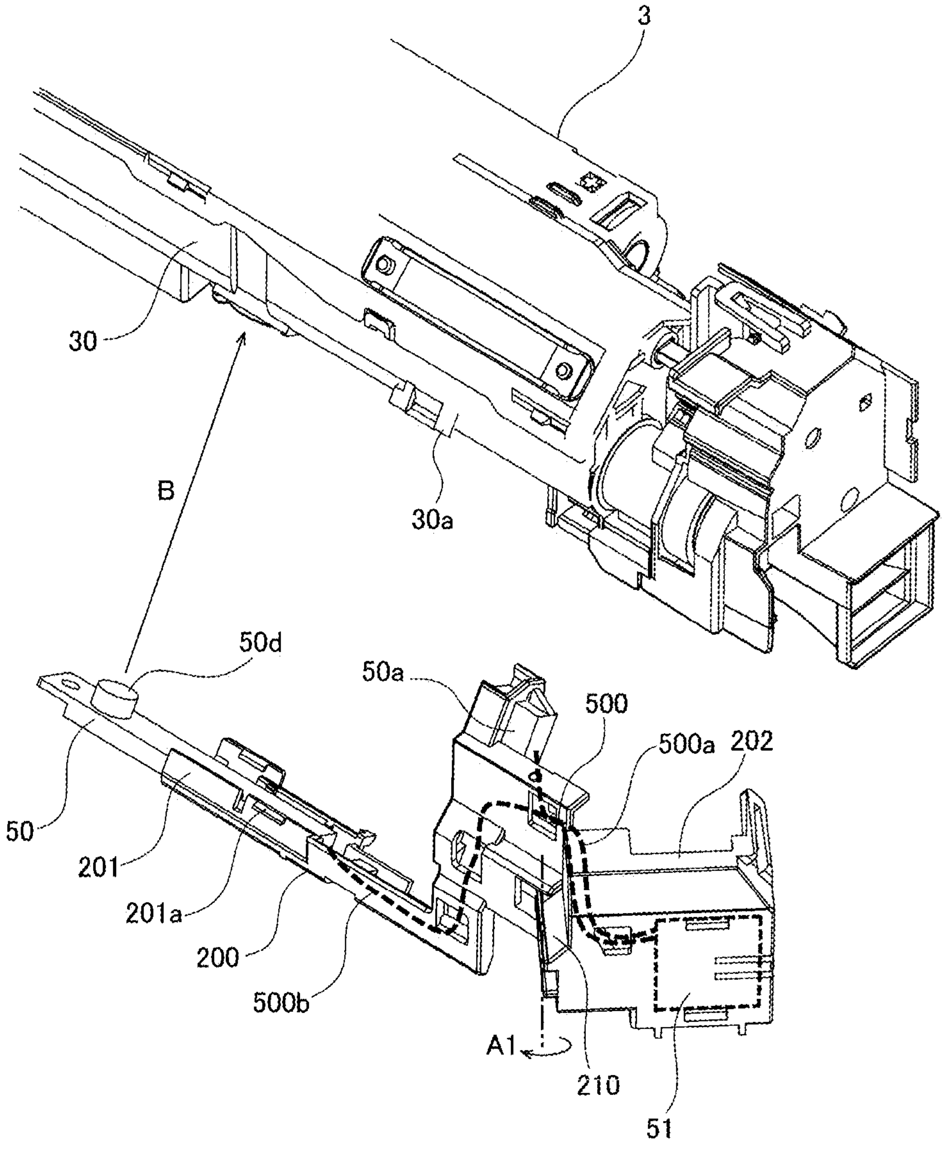
FIG. 8 is a perspective view illustrating a method of assembling the subunit according to the first embodiment.
Figure 9A:
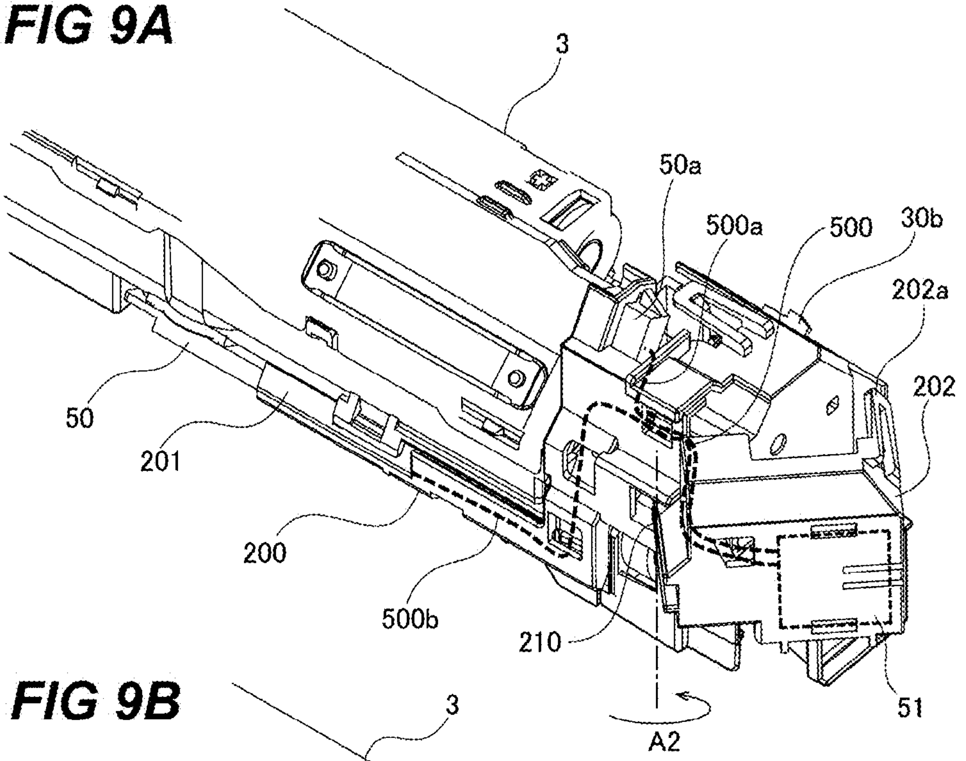
FIGS. 9(*a*) and 9(*b*) are perspective views illustrating a method of assembling the subunit according to the first embodiment.
Figure 9B:
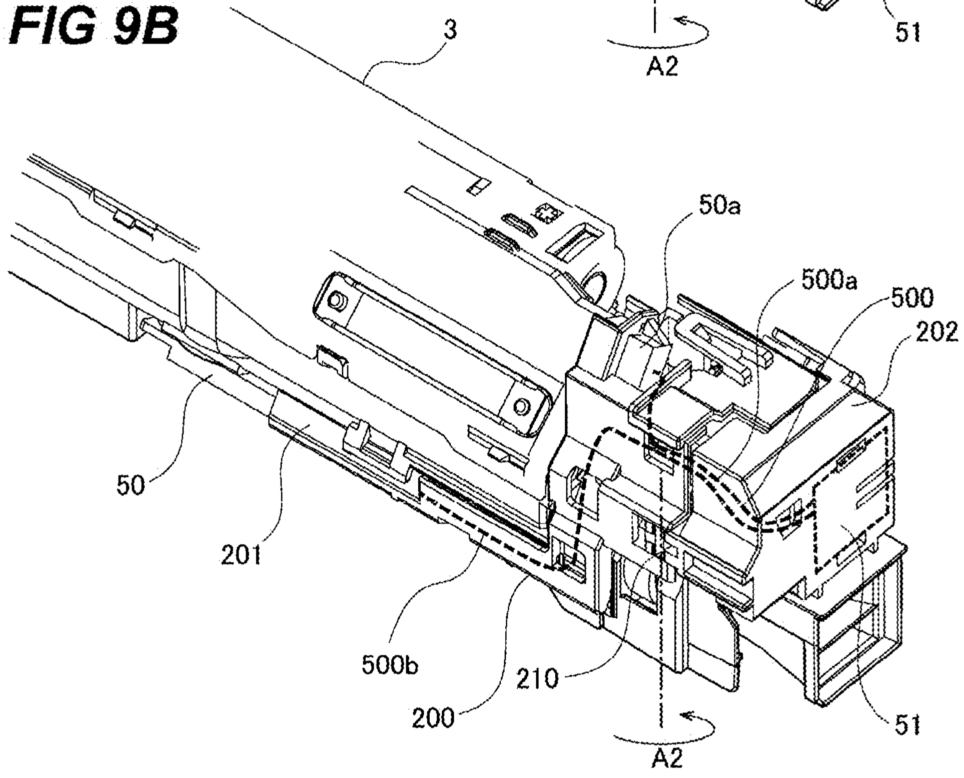

Next, a procedure of attaching the subunit 200 to the developing unit 3 will be described with reference to FIGS. 8, 9(*a*), and 9(*b*). FIG. 8 is a perspective view illustrating a method of assembling the subunit according to the first embodiment. FIGS. 9(*a*) and 9(*b*) are perspective views illustrating a method of assembling the subunit according to the first embodiment.

When the subunit 200 is attached to the developing unit 3, the inductance sensor 50 is attached in an arrow direction B in a state that the first cable guide 201 and the second cable guide 202 are opened in the rotation direction A1 as illustrated in FIG. 8. That is, the first cable guide 201 is attached to the developing unit 3. Since a detection portion 50*d* of the inductance sensor 50 protrudes from the surface of the inductance sensor 50, and it is necessary to cause the detection portion 50*d* to enter the inside of the developing container 30, such an assembling direction is used. When the first cable guide 201 is moved in an arrow direction B, a locking projection 201*a* of the first cable guide 201 is engaged with a locking portion 30*a* of the developing unit 3, and thus the first cable guide 201 is fixed to the developing unit 3.

Thereafter, as illustrated in FIG. 9(*a*), the second cable guide 202 is rotated in a rotation direction A2 about the shaft portion 210. That is, the second cable guide 202 is relatively moved with respect to the first cable guide 201 fixed to the developing unit 3. As a result, the locking projection 202*a* of the second cable guide 202 is engaged with the locking portion 30*b* of the developing unit 3, and thus the second cable guide 202 is fixed to the developing unit 3.

As described above, the relative movement is restricted by attaching the first cable guide 201 to the first surface (here, the upper surface and the lower surface) of the developing unit 3 and then attaching the second cable guide 202 to the second surface (here, the front surface) of the developing unit 3. That is, as illustrated in FIG. 9(*b*), the subunit 200 is fixed to the developing unit 3.

As illustrated in FIG. 9(*a*), the first cable guide 201 is attached to the side surface that is a first surface of the developing unit. Further, as illustrated in FIG. 9(*b*), the second cable guide 202 is attached to the front surface that is the second surface different from the first surface of the developing unit 3 (that is, the second surface intersecting the first surface of the developing unit 3). That is, as illustrated in FIG. 9(*b*), the subunit 200 is attached closer to the upstream end of the developing unit 3 in the mounting direction (insertion direction G1) for the image forming apparatus 60. Further, the connector 50*a* is disposed on the upper surface side of the subunit 200. Thus, immediately before the developing unit 3 is inserted into the image forming apparatus 60 and mounted on the image forming apparatus 60, the connector on the image forming apparatus 60 side and the connector 50*a* on the developing unit 3 side may be connected on the near side of the image forming apparatus 60 (the upstream side in the insertion direction G1). In addition, it is possible to reduce a risk that it is difficult to process and store an extra length of the cable 501 (see FIG. 3) in the image forming apparatus 60.

As described above, the connector 50*a*, the inductance sensor 50, the storage device 51, and the cable 500 connecting the constituents are formed into a subunit, and the subunit 200 is attached to the developing unit 3 through engagement between the locking projection and the locking portion. As a result, it is possible to perform assembly without changing the orientation of the developing unit 3, and it is possible to reduce the risk of breakage and assembly man-hours and to efficiently perform production.

In addition, the life of an electrical component is often longer than the life of the developing unit 3, and the electrical component and the cable are integrated to form the subunit 200, so that the entire subunit 200 is detached from the collected developing unit 3. By transplanting the detached subunit 200 into another developing unit 3 in which a component other than the subunit 200 is replaced with a new component, it is possible to reduce man-hours for newly assembling the subunit 200 and to efficiently produce a regenerated product of the unit.

The subunit 200 is detachably attached to the developing unit 3. In the procedure of detaching the subunit 200 from the developing unit 3, the engagement between the locking projection 202*a* of the second cable guide 202 and the locking portion 30*b* of the developing unit 3 is released, and the second cable guide 202 is rotated about the shaft portion 210 in a direction opposite to the rotation direction A2 illustrated in FIG. 9(*a*) (the rotation direction A1 illustrated in FIG. 8). The engagement between the locking projection 201*a* of the first cable guide 201 and the locking portion 30*a* of the developing unit 3 is released, and the first cable guide 201 is moved in a direction opposite to the arrow direction B illustrated in FIG. 8. As a result, the subunit 200 can be detached from the developing unit 3.

As described above, by forming the electrical components and the cables in the developing unit 3 into a subunit, it is possible to reduce man-hours and the risk at the time of assembly with a simple configuration, and to more efficiently perform production of a new product or cyclic regeneration of the developing unit that is a consumable unit.

Second Embodiment

Next, configurations of a unit and an image forming apparatus according to a second embodiment will be described. In the above-described embodiment, an example in which the present invention is applied to the developing unit 3 has been described, but in the present embodiment, an example in which the present invention is applied to the drum unit 11 will be described. Since a schematic configuration of the image forming apparatus is similar to that of the above-described embodiment, the description thereof will be omitted here. In addition, in the present embodiment, description of portions overlapping with the first embodiment described above will be omitted.

(Configuration of Drum Unit)

Figure 10A:
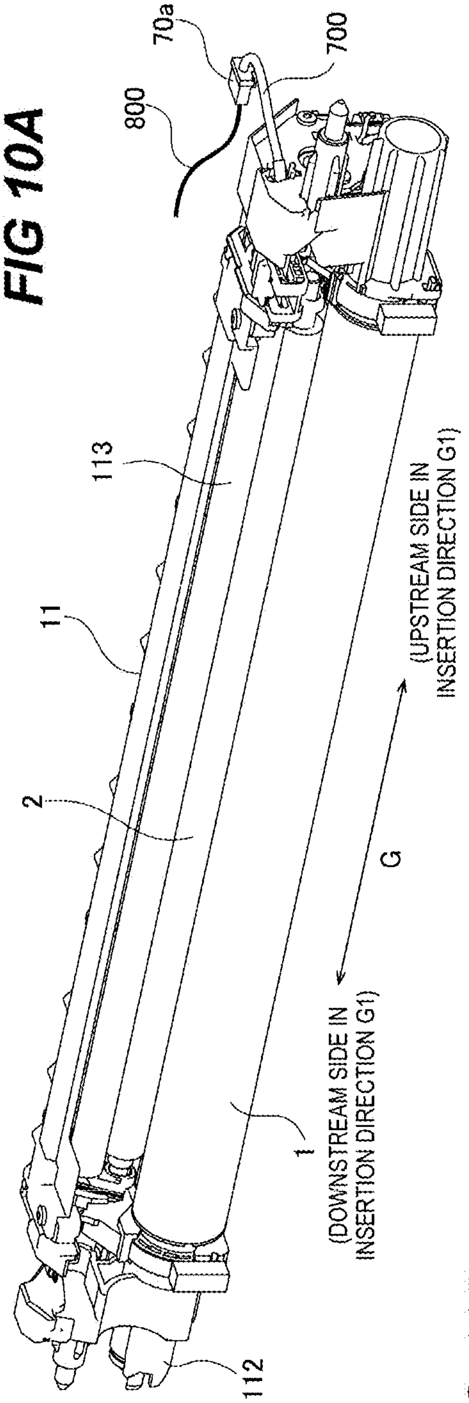
FIGS. 10(*a*) and 10(*b*) are perspective views illustrating a configuration of a drum unit according to a second embodiment.
Figure 10B:
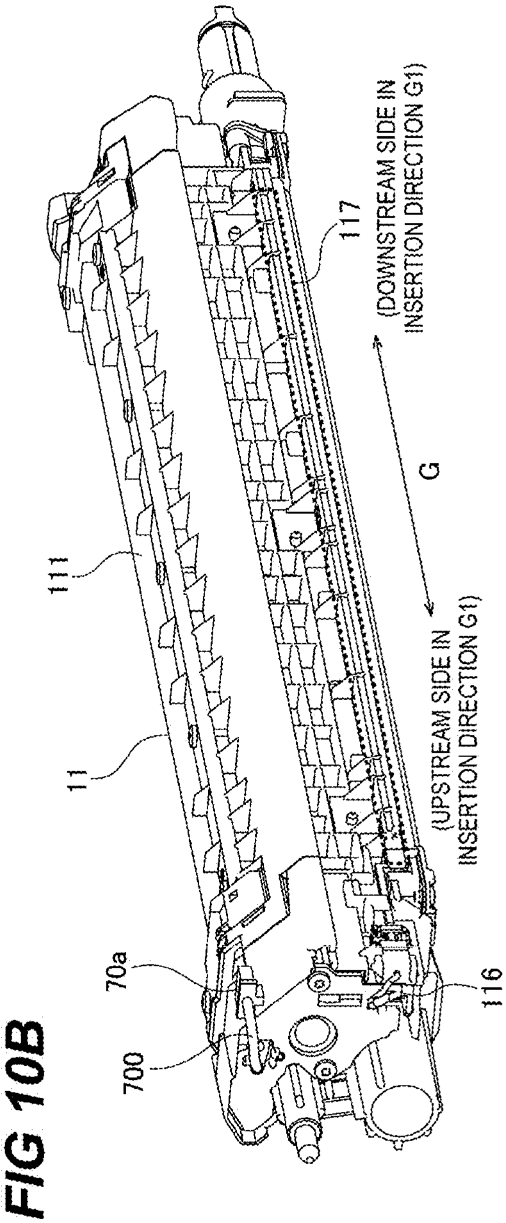
Figure 11:
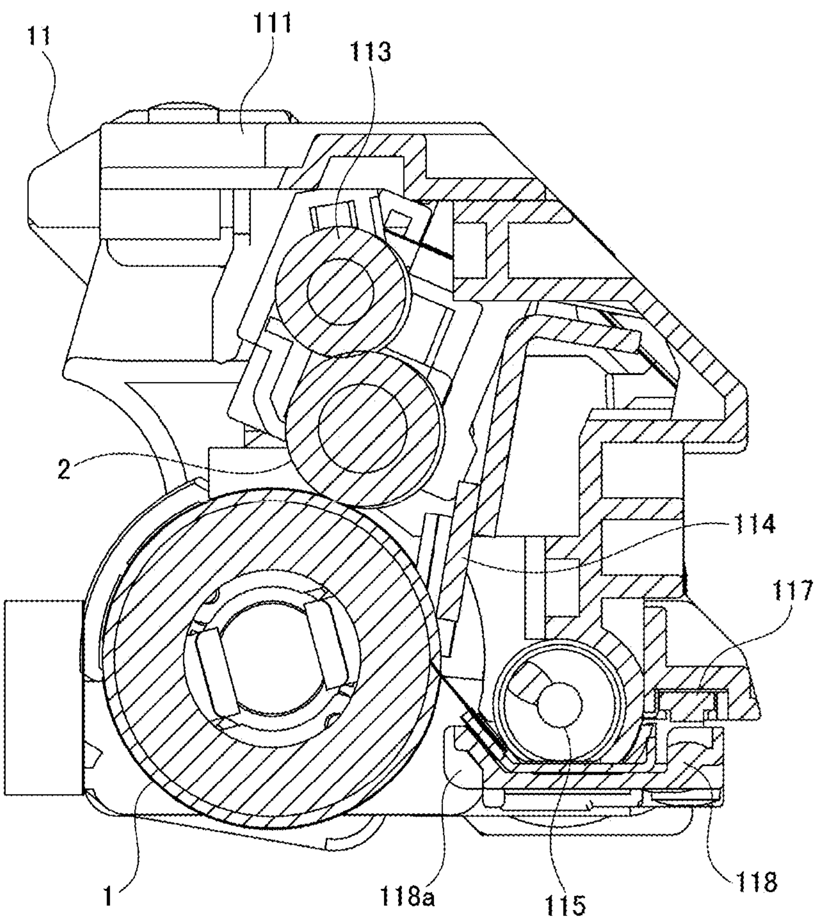
FIG. 11 is a cross-sectional view illustrating a configuration of the drum unit according to the second embodiment.

A drum unit 11 according to the second embodiment will be described with reference to FIGS. 10(*a*), 10(*b*), and 11. FIGS. 10(*a*) and 10(*b*) are perspective views illustrating a configuration of the drum unit 11 according to the second embodiment. FIG. 11 is a cross-sectional view illustrating a configuration of the drum unit 11 according to the second embodiment.

The drum unit 11 is configured as a replaceable unit for the image forming apparatus 60, and is configured to be replaceable independently of the developing unit 3. One of the reasons is that the developing unit 3 and the drum unit 11 are individually replaced due to a difference in the life as described above, and the running cost of the product is reduced.

The drum unit 11 includes a drum frame 111 that rotatably supports the photosensitive drum 1. The photosensitive drum 1 is rotated about a photosensitive drum axis by transmitting a driving force through a drum coupling 112 provided at one end.

The drum unit 11 includes a cable 700 such that the image forming apparatus 60 is electrically connected to the drum unit 11. The cable 700 connects a cable 800 of the image forming apparatus 60 and a connector 70*a* serving as an electrical connection portion, and is connected to a drum storage device 116 and a light emitter 117.

In the drum unit 11, a charging roller 2 that charges the surface of the photosensitive drum 1 to a uniform potential is disposed. The charging roller 2 is provided with a cleaning roller 113 cleaning the charging roller 2 at a position different from the position where the photosensitive drum 1 is in contact. The drum unit 11 is provided inside thereof with a cleaning blade 114 scraping off the toner remaining on the surface of the photosensitive drum 1 without being transferred to the intermediate transfer belt 61, and a collecting/conveying screw 115 conveying the scraped residual toner to the outside of the drum unit 11.

(Electrical Components of Drum Unit)

The drum unit 11 includes electrical components controlled by a controller (not illustrated) provided in the image forming apparatus 60. Here, as the electrical components, the light emitter 117 that irradiates the photosensitive drum 1 with light and the drum storage device 116 that stores information regarding the drum unit 11 are exemplified.

(Light Emitter)

Subsequently, the light emitter 117 provided to irradiate the photosensitive drum 1 of the drum unit 11 with light will be described.

The charging roller 2 uniformly charges the surface of the photosensitive drum 1 that is rotationally driven in advance. An exposure device 68 forms an electrostatic latent image on the surface of the photosensitive drum 1 charged by the charging roller 2 based on a signal regarding image information input to the image forming apparatus 60. The developing unit 3 includes a rotatable developing sleeve 70 serving as a developer bearing member that bears a developer. The developing unit 3 develops the electrostatic latent image formed on the surface of the photosensitive drum 1 by the exposure device 68 by using the developer born on the surface of the developing sleeve 70. As a result, the toner adheres to an exposed portion (a portion irradiated with light) on the surface of the photosensitive drum 1 and is turned into a visible image. A transfer bias is applied to the primary transfer roller 4, and the toner image formed on the surface of the photosensitive drum 1 is transferred onto the intermediate transfer belt 61. The toner (transfer residual toner) remaining on the surface of the photosensitive drum 1 after the primary transfer is recovered by the cleaning blade 114 and the collecting/conveying screw 115, and preparation for the next image forming process is performed again.

In this case, on the surface of the photosensitive drum 1, there are a portion irradiated with light by the exposure device 68 and a portion not irradiated with light in the previous image formation, and these portions are in a state that there is a difference in drum surface potential. If the photosensitive drum 1 is charged again by the charging roller 2 in this state, a difference remains in the surface potential after charging, which causes an image forming defect.

Therefore, during the period from the primary transfer to the charging, the entire region of the photosensitive drum 1 in the longitudinal direction is irradiated with light by the light emitter 117, and a drum surface potential returns to a uniform state.

In a case where the light emitter 117 cannot be disposed in the vicinity of the photosensitive drum 1, the light from the light emitter 117 is guided to the surface of the photosensitive drum 1 by using a light guide member 118 as illustrated in FIG. 11. In this case, the light emitted from the light emitter 117 passes through the light guide member 118, and is applied from the end 118*a* on the photosensitive drum 1 side toward the photosensitive drum 1.

(Storage Device)

Next, the drum storage device 116 in which information regarding the drum unit 11 is written will be described.

The drum storage device 116 is disposed on the front surface of the drum unit 11 on the upstream side in the insertion direction G1.

The drum storage device 116 stores life information of the drum unit 11 as information regarding the drum unit 11. The controller (not illustrated) of the image forming apparatus 60 uses the life information written in the drum storage device 116 as a trigger for adjusting a voltage to the charging roller 2 when the photosensitive drum 1 is charged or delivering the next drum unit to a user before the drum unit 11 reaches its end of life.

Here, the life information of the drum unit has been exemplified as the information regarding the drum unit 11. However, the information regarding the drum unit 11 is not limited thereto, and may be other operation information or setting values of the unit.

(Electrical Connection between Light Emitter and Drum Storage Device in Drum Unit)

Figure 12:
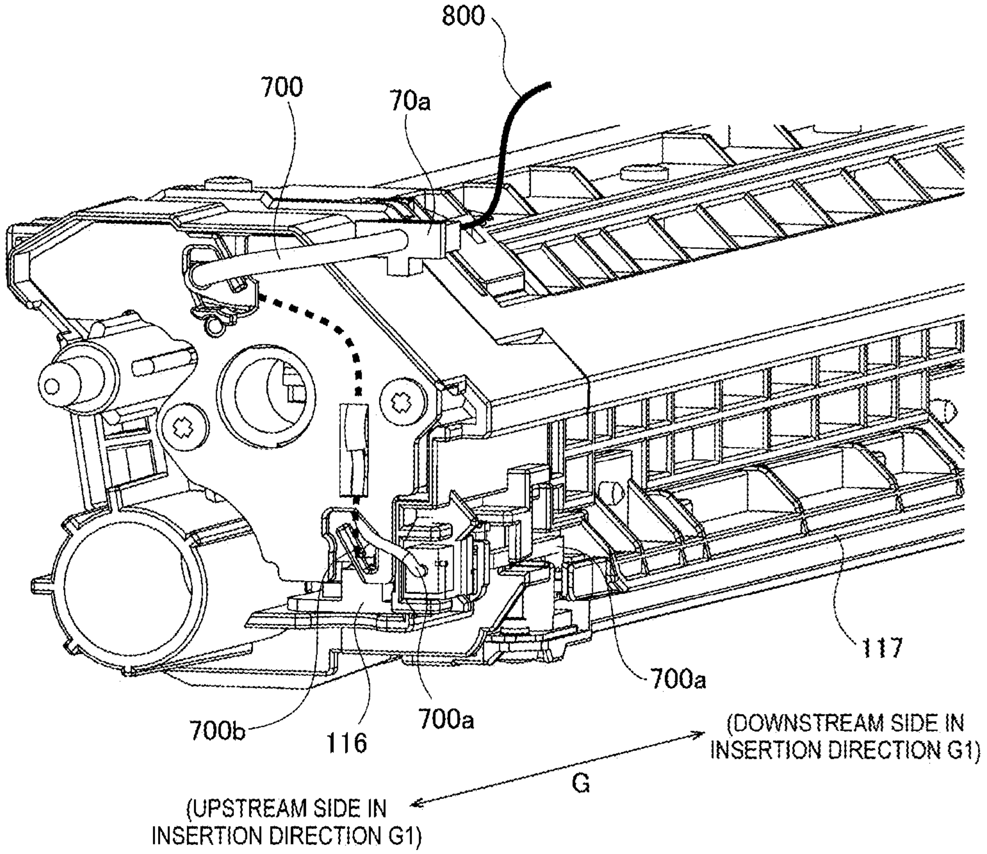
FIG. 12 is a perspective view illustrating a configuration of a subunit according to the second embodiment.

Next, electrical connection between the light emitter 117 and the drum storage device 116 provided in the drum unit 11 will be described with reference to FIG. 12. FIG. 12 is a perspective view illustrating a configuration of the subunit 200 according to the second embodiment.

As described above, the image forming apparatus 60 includes the controller (not illustrated) including a CPU or the like that controls power and signals for electrical components of various units. The drum unit 11 that is detachably attachable to the image forming apparatus 60 includes an electrical connection portion electrically connected to the image forming apparatus 60. Here, the drum unit 11 includes a connector 70*a* serving as an electrical connection portion supplying power to and communicating with the light emitter 117 and the drum storage device 116 provided in the drum unit 11, and used for connection to the cable 800 on the image forming apparatus 60 side.

Here, the connector is exemplified as an electrical connection portion included in the drum unit, but the present invention is not limited thereto, and another electrical connection portion such as an electrical contact may be used.

In the present embodiment, a connector (not illustrated) serving as an electrical connection portion is also provided in the cable 800 on the image forming apparatus 60 side. The connector (not illustrated) of the cable 800 on the image forming apparatus 60 side and the connector 70*a* on the drum unit 11 side have a male-female relationship. For example, in a case where the connector (not illustrated) on the image forming apparatus 60 side has a male shape, the connector 70*a* on the drum unit 11 side has a female shape. Alternatively, in a case where the connector (not illustrated) on the image forming apparatus 60 side has a female shape, the connector 70*a* on the drum unit 11 side has a male shape.

The connector 70*a* on the drum unit 11 side is preferably disposed on the upstream side in the insertion direction G1. This is because when the connector 70*a* on the drum unit 11 side is disposed on the upstream side in the insertion direction G1, an electrical path from the light emitter 117 to the connector 70*a* is shorter than when the connector is disposed on the downstream side in the insertion direction G1.

In addition, the connector (electrical connection portion) on the image forming apparatus 60 side is electrically connected to the controller (not illustrated) of the image forming apparatus 60 via the cable 800. Assume that the connector 70*a* on the drum unit 11 side is located on the far side in the insertion/extraction direction G (the downstream side in the insertion direction G1). In this case, first, when the drum unit 11 is inserted into (mounted on) the image forming apparatus 60, the connector on the image forming apparatus 60 side and the connector 70*a* on the drum unit 11 side are electrically connected on the near side of the image forming apparatus 60 (the upstream side in the insertion direction G1). Thereafter, it is necessary to further insert the drum unit 11 in the insertion direction G1 until the drum unit 11 is mounted on the image forming apparatus 60. In this case, a free length of the cable 800 connecting the controller of the image forming apparatus 60 and the connector on the image forming apparatus 60 side needs to be increased so that an electrical connection state between the connector on the image forming apparatus 60 side and the connector 70*a* on the drum unit 11 side is maintained. Thus, it is difficult to process and store an extra length of the cable 800 (electric bundle wires) in the image forming apparatus 60.

Therefore, a connection process between the image forming apparatus 60 and the drum unit 11 is preferably performed after the mounting of the drum unit 11 is completed. Therefore, in the present embodiment, in the insertion/extraction direction G, the connector 70*a* on the drum unit 11 side is disposed on the front side orthogonal to the insertion direction G1 on the near side of the image forming apparatus 60 (the upstream side in the insertion direction G1).

The drum storage device 116 needs to be connected to the image forming apparatus 60 in order to exchange information such as operation information with the image forming apparatus 60. Therefore, when the drum storage device 116 is disposed in the drum unit 11, the drum storage device is preferably disposed on the upstream side in the insertion direction G1 from the viewpoint of the electrical path from the connector 70*a*. This is preferable from the viewpoint of the downsizing of the drum unit 11 and the risk of failure of the electrical path without complicating the routing of the cable. Thus, the drum storage device 116 is disposed on the front surface on the upstream side in the insertion direction G1.

The light emitter 117 needs to emit light over the entire region of the surface of the photosensitive drum 1 in the longitudinal direction in order to make a surface potential of the photosensitive drum 1 uniform and reset the potential to an initial state. Therefore, the light emitter 117 is disposed on the entire region of the side surface of the drum unit 11 in the longitudinal direction. The light from the light emitter 117 passes through the light guide member 118 and is applied from the drum-side end 118*a* of the light guide member 118 toward the photosensitive drum 1.

The cable 700 having the connector 70*a* is branched into a cable 700*a* connected to the light emitter 117 and a cable 700*b* connected to the drum storage device 116 with the connector 70*a* side as a starting point. Each of the cables 700*a* and 700*b* is a set line of a plurality of lines of earth, power, signals, and the like to an electrical component.

The connector 70*a* and the drum storage device 116 are disposed on the unit front surface orthogonal to the insertion direction G1 on the upstream side of the insertion direction G1, and the light emitter 117 is disposed on the unit side surface, and the disposition surfaces cannot be aligned, which causes the same problem as the developing unit 3 described above.

Therefore, as illustrated in FIG. 12, the drum unit 11 according to the present embodiment includes a subunit 900 in which the connector 70*a*, the light emitter 117, the drum storage device 116, the cable 700, and a cable guide holding the constituents are integrated. By assembling the subunit 900 to the drum unit 11 at the end of the assembling process, it is possible to eliminate the work of directly routing the cable 700 on the drum unit 11, and to solve the above-described problem.

(Subunit)

Figures 13A, 13B:
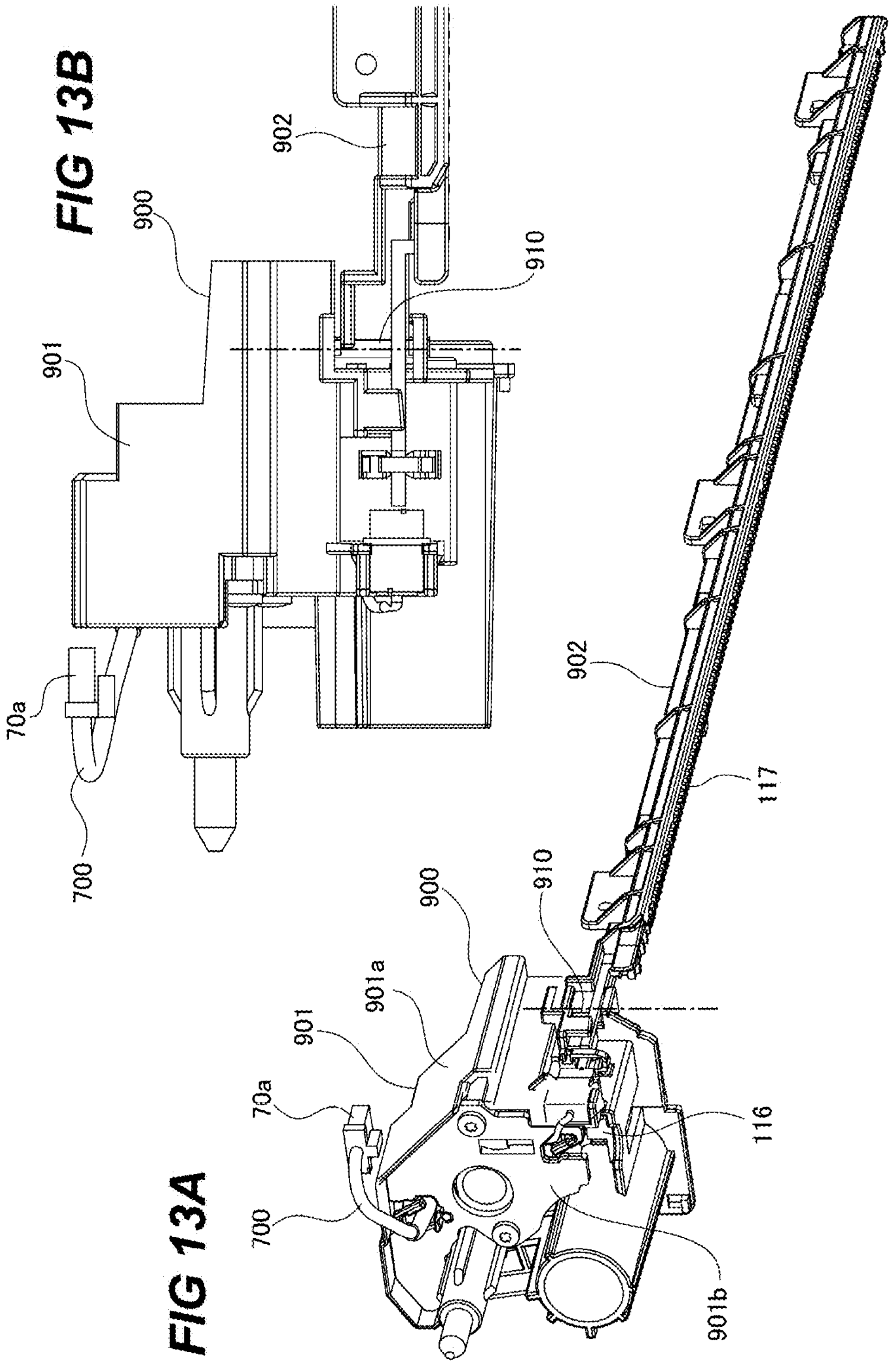
FIG. 13(*a*) is a perspective view illustrating a configuration of the subunit according to the second embodiment, and FIG. 13(*b*) is a side view illustrating a configuration of the subunit according to the second embodiment.

Next, the configuration of the subunit 900 will be described with reference to FIGS. 13(*a*), 13(*b*), and 14. FIGS. 13(*a*), 13(*b*), and 14 are perspective views illustrating a configuration of the subunit according to the second embodiment.

Also in the drum unit 11, since the electrical components are present on a plurality of surfaces in the unit, the cable 700 is also routed on the plurality of surfaces. Therefore, in the drum unit 11, the same problems as those of the developing unit 3 described above occur, but these problems can be solved by forming electrical components and cables into a subunit.

Specifically, the subunit 900 holds the connector 70*a*, the light emitter 117, the drum storage device 116, and the cable 700, and is attached to the drum unit 11.

The connector 70*a* is an electrical connection portion electrically connected to the image forming apparatus 60, and is provided at one end of the cable 700. The light emitter 117 and the drum storage device 116 are electrical components controlled by the controller (not illustrated) provided in the image forming apparatus 60. That is, the electrical components include the light emitter 117 serving as a first electrical component controlled by the controller, and the drum storage device 116 serving as a second electrical component controlled by the controller. The cable 700 is a cable that electrically connects the connector 70*a*, the light emitter 117, and the drum storage device 116.

The subunit 900 includes a second cable guide 901 that holds the drum storage device 116 and the cable 700, and a first cable guide 902 that holds the light emitter 117 and the cable 700 and is provided to be relatively movable with respect to the second cable guide 901.

In other words, the light emitter 117 is attached to the first cable guide 902, and the drum storage device 116 and the connector 70*a* are attached to the second cable guide 901. The cable 700 is connected to the light emitter 117, the drum storage device 116, and the connector 70*a*, and is thus attached across the cable guide 901 and the cable guide 902.

The first cable guide 902 and the second cable guide 901 are pivotally supported by a shaft portion 910 and are configured to be relatively movable with respect to each other. That is, the first cable guide 902 and the second cable guide 901 are rotatably supported by the shaft portion 910. Since the first cable guide 902 and the second cable guide 901 are relatively movably engaged, the subunit 900 can be directly attached to the drum unit 11.

Therefore, the subunit 900 according to the present embodiment includes the light emitter 117, the drum storage device 116, the connector 70*a*, the cable 700, the cable guide 901, and the cable guide 902.

Details of the subunit 900 will be described.

As described above, the drum storage device 116 is attached to the second cable guide 901. Since the second cable guide 901 (subunit 900) is attached to the drum unit 11, the drum storage device 116 is disposed on the front surface (first surface) on the upstream side of the drum unit 11 in the insertion direction G1.

The connector 70*a* is provided at one end of the cable 700 and attached to the second cable guide 901. Since the second cable guide 901 (subunit 900) is attached to the drum unit 11, the connector 70*a* is disposed on the front surface (first surface) of the drum unit 11 on the upstream side in the insertion direction G1 and on the upper side of the front surface.

The light emitter 117 is attached to the first cable guide 902. When the first cable guide 902 (subunit 900) is attached to the drum unit 11, the light emitter 117 is disposed on the lower surface (a second surface different from the first surface) of the drum unit 11 on the upstream side in the insertion direction G1.

In a case where the cable 700 is directly attached to the drum unit 11 without passing through the subunit 900, the cable 700 is routed on a plurality of surfaces of the drum unit 11 in order to connect the light emitter 117 and the drum storage device 116 that are present on different surfaces. That is, the cable 700 is routed on the front surface and the lower surface of the drum unit 11.

Figure 14:
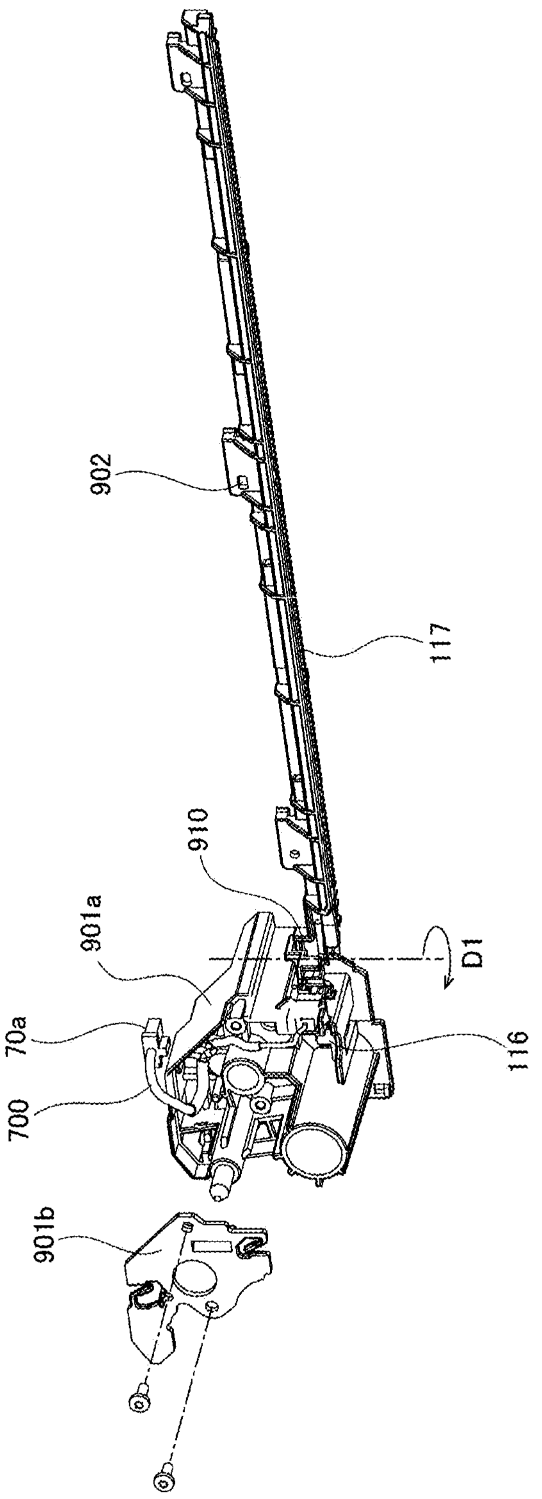
FIG. 14 is a perspective view illustrating a configuration of the subunit according to the second embodiment.

Therefore, the drum storage device 116 is disposed in the second cable guide 901, and the light emitter 117 is disposed in the first cable guide 902. Further, the drum storage device 116 and the light emitter 117 are connected, and the cable 700 having the connector 70*a* at one end is assembled to the second cable guide 901 and the first cable guide 902. Here, when the subunit 900 is assembled, the first cable guide 902 is rotated in a rotation direction D1 with respect to the second cable guide 901 (901*a*) about the shaft portion 910 as illustrated in FIG. 14. As a result, the cable 700 can be routed without changing an orientation of the subunit 900 in order to direct the surface on which the cable 700 is routed to the front of an operator.

Thereafter, a cable guide cover 901*b* is attached to the second cable guide 901. The cable guide 901 and the cable guide 902 are pivotally supported by the shaft portion 910. As a result, when an assembly operator carries the subunit 900 after assembling the subunit 900, damage to the cable 700 can be prevented even in a state that only one side of the cable guide is gripped, and a risk such as disconnection can be reduced.

Figure 15A:
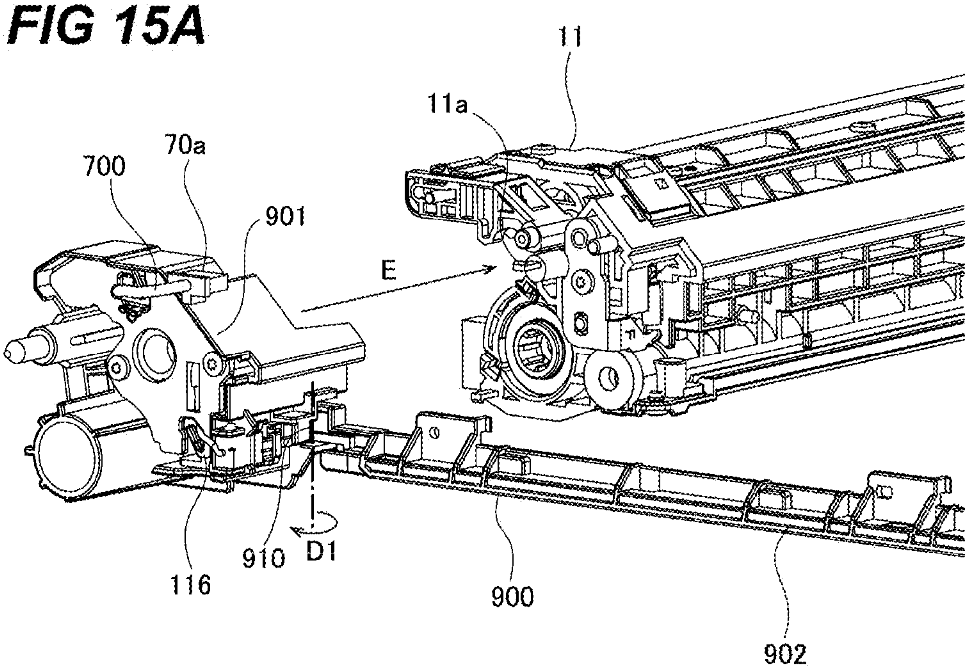
FIGS. 15(*a*) and 15(*b*) are perspective views illustrating a method of assembling the subunit according to the second embodiment.
Figure 15B:
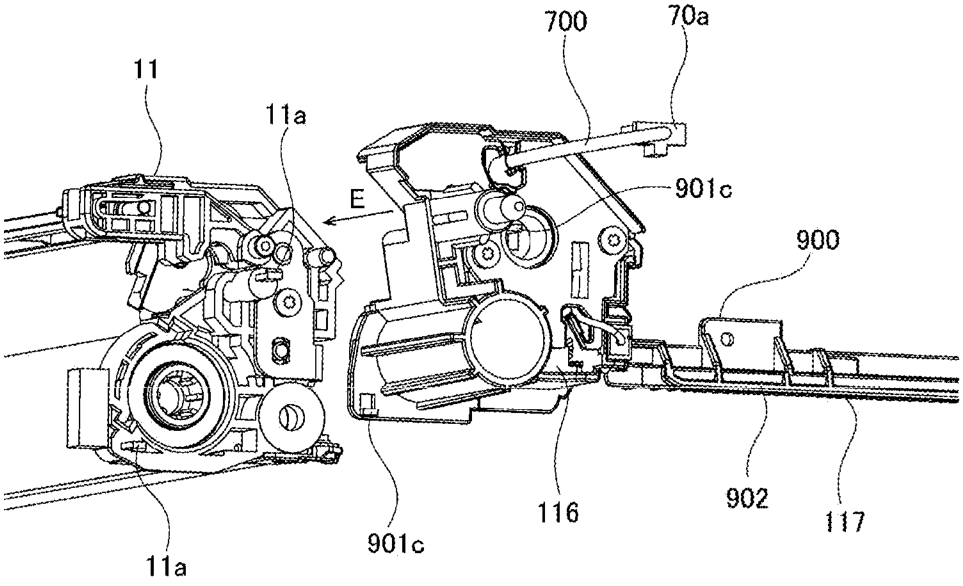

Next, a procedure of attaching the subunit 900 to the drum unit 11 will be described with reference to FIGS. 15(*a*), 15(*b*), 16(*a*), and 16(*b*). FIGS. 15(*a*), 15(*b*), 16(*a*), and 16(*b*) are perspective views illustrating a method of assembling the subunit according to the second embodiment.

When the subunit 900 is attached to the drum unit 11, the second cable guide 901 is attached in an arrow direction E in a state that the second cable guide 901 and the first cable guide 902 are rotated in the rotation direction D1 as illustrated in FIGS. 15(*a*) and 16(*b*). That is, the second cable guide 901 is attached to the drum unit 11. Since it is necessary to assemble the second cable guide 901 in the rotation axial direction of the photosensitive drum 1 in order to position the second cable guide 901 with respect to the photosensitive drum 1, such an assembling direction is used. When the second cable guide 901 is moved in the arrow direction E, a locking portion 901*c* of the second cable guide 901 and a locking projection 11*a* of the drum unit 11 are engaged, and thus the second cable guide 901 is fixed to the drum unit 11.

Figure 16A:
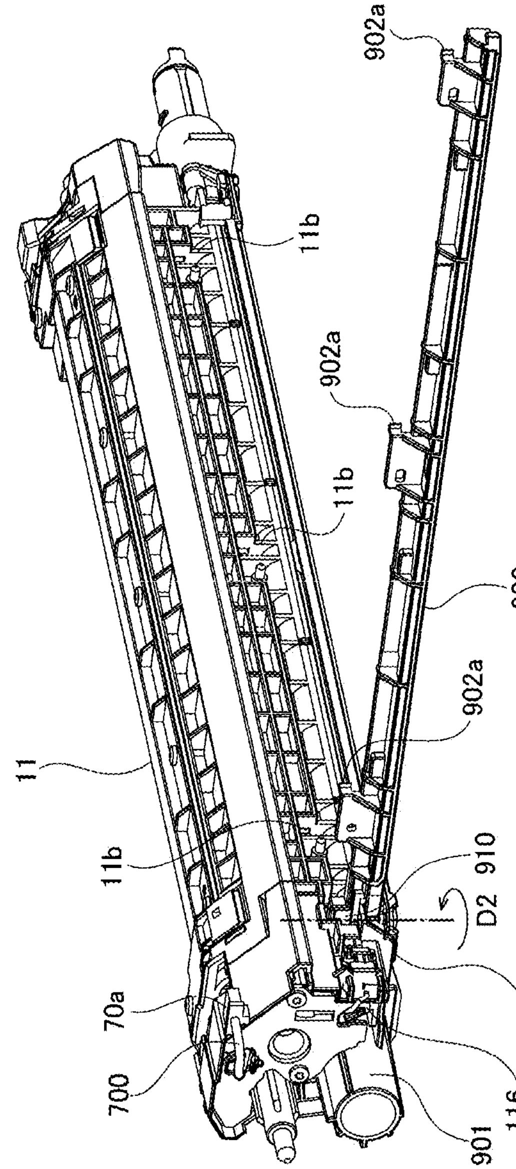
FIGS. 16(*a*) and 16(*b*) are perspective views illustrating a method of assembling the subunit according to the second embodiment.
Figure 16B:
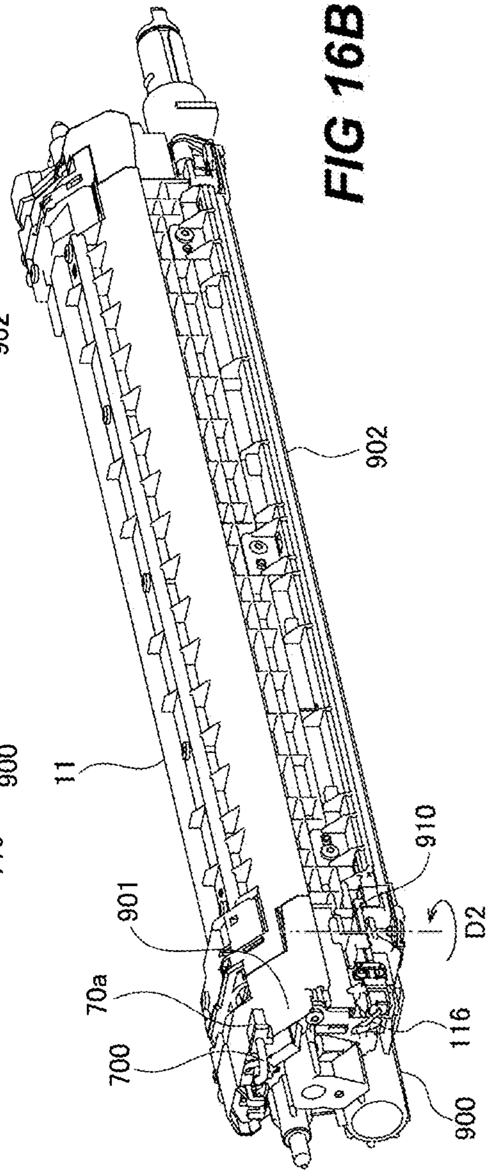

Thereafter, as illustrated in FIG. 16(*a*), the first cable guide 902 is rotated in the rotation direction D2 about the shaft portion 910. That is, the first cable guide 902 is relatively moved with respect to the second cable guide 901 fixed to the drum unit 11. As a result, the locking projection 902*a* of the first cable guide 902 is engaged with the locking portion 11*b* of the drum unit 11, and thus the first cable guide 902 is fixed to the drum unit 11.

As described above, the relative movement is restricted by attaching the second cable guide 901 to the second surface (here, the front surface) of the drum unit 11 and then attaching the first cable guide 902 to the first surface (here, the lower surface) of the drum unit 11. That is, as illustrated in FIG. 16(*b*), the subunit 900 is fixed to the drum unit 11.

As illustrated in FIG. 16(*a*), the second cable guide 901 is attached to the front surface that is the first surface of the drum unit 11. As illustrated in FIG. 16(*b*), the first cable guide 902 is attached to the lower surface that is the second surface (that is, the second surface intersecting the first surface of the drum unit 11) different from the first surface of the drum unit 11. That is, as illustrated in FIG. 16(*b*), the subunit 900 is attached closer to the upstream end of the drum unit 11 in the mounting direction (insertion direction G1) for the image forming apparatus 60. Further, the connector 70*a* is disposed on the front surface side (and the upper side of the front surface) of the subunit 900. Thus, immediately before the drum unit 11 is inserted into the image forming apparatus 60 and the drum unit 11 is mounted on the image forming apparatus 60 (or after the drum unit 11 is mounted), the connector on the image forming apparatus 60 side and the connector 70*a* on the drum unit 11 side may be connected on the near side of the image forming apparatus 60 (the upstream side in the insertion direction G1). In addition, it is possible to reduce a risk that it is difficult to process or store an extra length of the cable 800 in the image forming apparatus 60.

As described above, the light emitter 117 and the drum storage device 116 are connected, the cable 700 having the connector 70*a* at one end is formed into a subunit, and the subunit 900 is attached to the drum unit 11 through engagement between the locking projection and the locking portion. As a result, it is possible to perform assembly without changing the orientation of the drum unit 11, and it is possible to reduce the risk of breakage and assembly man-hours and to efficiently perform production.

In addition, the life of an electrical component is often longer than the life of the drum unit 11, and the electrical component and the cable are integrated to form the subunit 900, so that the entire subunit 900 is detached from the collected drum unit 11. By transplanting the detached subunit 900 into another drum unit 11 in which a component other than the subunit 900 is replaced with a new component, man-hours for newly assembling the subunit 900 can be reduced, and a regenerated product of the unit can be efficiently produced.

The subunit 900 is detachably attached to the drum unit 11. In the procedure of detaching the subunit 900 from the drum unit 11, the engagement between the locking projection 902*a* of the first cable guide 902 and the locking portion 11*b* of the drum unit 11 is released, and the first cable guide 902 is rotated about the shaft portion 910 in a direction opposite to the rotation direction D2 illustrated in FIG. 16(*a*) (the rotation direction D1 illustrated in FIG. 15(*a*)). The engagement between the locking portion 901*c* of the second cable guide 901 and the locking projection 11*a* of the drum unit 11 is released, and the second cable guide 902 is moved in a direction opposite to the arrow direction E illustrated in FIG. 15(*a*). As a result, the subunit 900 can be detached from the drum unit 11.

As described above, by forming the electrical components and the cables in the drum unit 11 into a subunit, it is possible to reduce man-hours and the risk at the time of assembly with a simple configuration, and to more efficiently perform production of a new product or cyclic regeneration of the drum unit that is a consumable unit.

Other Embodiments

Figure 17A:
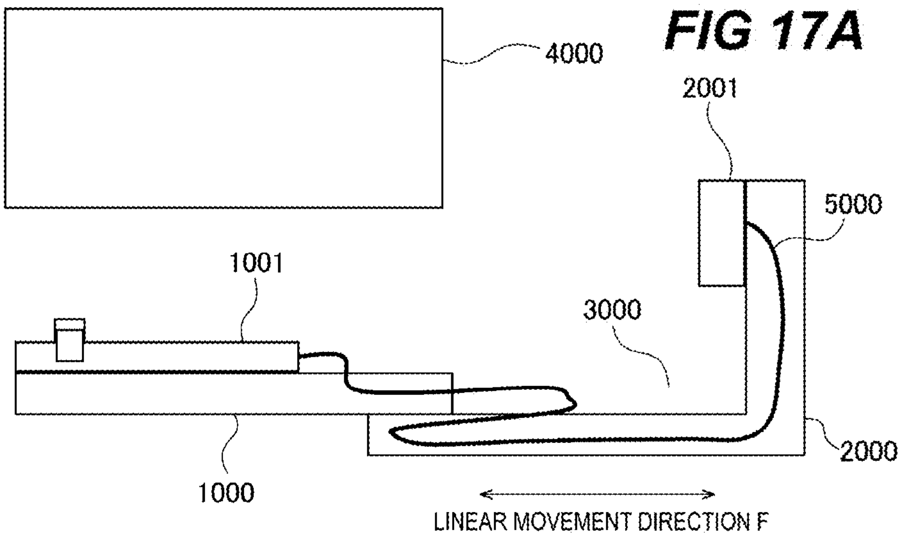
FIGS. 17(*a*), 17(*b*), and 17(*c*) are schematic diagrams illustrating a configuration of a subunit according to another embodiment.
Figure 17B:
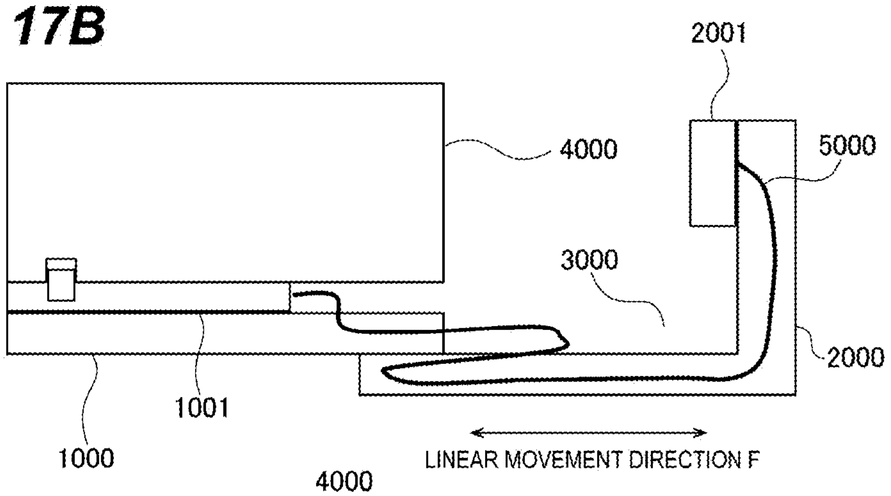
Figure 17C:
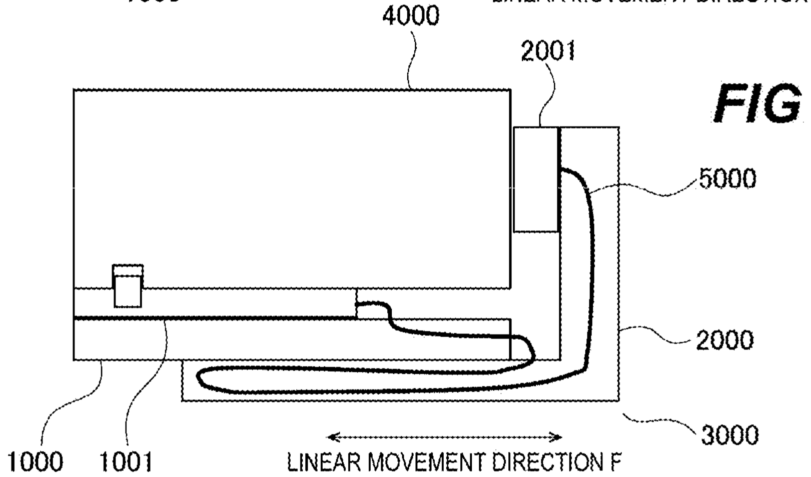

In the first embodiment and the second embodiment, the configuration in which the cable guides of the subunit are provided to be relatively movable through rotation using the shaft portion has been exemplified, but the present invention is not limited thereto. As illustrated in FIGS. 17(*a*), 17(*b*), and 17(*c*), cable guides of a subunit 3000 attached to a consumable unit 4000 may be linearly moved relative to each other by the slide mechanism. In this case, a cable guide 1000 includes an image forming electrical component 1001 (an inductance sensor or a light emitter), and a cable guide 2000 includes an interface component 2001 (an electrical connection portion or a storage device) connected to the image forming apparatus 60.

That is, the subunit 3000 holds the image forming electrical component 1001, the interface component 2001, and a cable 5000 that electrically connects the components, and is detachably attached to the consumable unit 4000.

The subunit 3000 further includes a first cable guide 1000 that holds the image forming electrical component 1001 and the cable 5000, and a second cable guide 2000 that holds the interface component 2001 and the cable 5000. The second cable guide 2000 is provided to be relatively movable with respect to the first cable guide 1000 by a slide mechanism (not illustrated). That is, the first cable guide 1000 and the second cable guide 2000 are supported to be capable of reciprocating in a linear movement direction F which is one direction by using the slide mechanism. Here, the linear movement direction F of the cable guide is the same direction as the insertion/extraction direction G of the unit.

When the subunit 3000 is attached to the consumable unit 4000, first, the first cable guide 1000 is attached to the lower surface (first surface) of the consumable unit 4000 (FIG. 17(*b*)). As a result, the image forming electrical component 1001 held by the first cable guide 1000 is disposed on the lower surface of the consumable unit 4000.

Thereafter, the second cable guide 2000 is moved in the linear movement direction F with respect to the fixed first cable guide 1000 by the slide mechanism, and is attached to the front surface (a second surface different from the first surface) of the consumable unit 4000. As a result, the interface component 2001 held by the second cable guide 2000 is disposed on the front surface of the consumable unit 4000. When the second cable guide 2000 is attached to the consumable unit 4000, an extra length of the cable 5000 is stored in the second cable guide 2000 as illustrated in FIG. 17(*c*).

Further, in the above-described embodiment, the case where the number of the relatively movable cable guides included in the subunit is two has been exemplified, but the present invention is not limited thereto, and the number of the relatively movable cable guides may be three or more.

Even with such a configuration, it is possible to reduce man-hours and risks at the time of assembly with a simple configuration and to more efficiently perform production of a new product or cyclic regeneration of the consumable unit by forming the electrical components and cables in the consumable unit into a subunit.

In the above embodiments, four image forming portions are used, but the number of image forming portions that are used is not limited, and may be appropriately set as necessary.

In the above embodiments, a unit attachable to and detachable from the image forming apparatus is not limited to the developing unit or the drum unit described above. For example, the unit may be another unit such as a process cartridge integrally including a photosensitive drum, a charging portion as a process portion acting on the photosensitive drum, a developing portion, and a cleaning portion.

Further, in the above embodiments, a printer has been exemplified as the image forming apparatus, but the present invention is not limited thereto. For example, another image forming apparatus such as a copying machine or a FAX machine, or another image forming apparatus such as a multifunction peripheral combining these functions may be used. In addition, the image forming apparatus has been exemplified in which toner images of respective colors are transferred onto the intermediate transfer member in a sequentially superimposed manner by using the intermediate transfer member, and the toner images born on the intermediate transfer member are collectively transferred to the transfer material, but the present invention is not limited thereto. For example, the image forming apparatus may be an image forming apparatus that uses a transfer material bearing member and transfers toner images of respective colors on a transfer material born by the transfer material bearing member in a sequentially superimposed manner. Similar effects can be achieved by applying the present invention to the unit that is attachable to and detachable from the image forming apparatus.

Furthermore, in the above embodiments, the electrophotographic system has been exemplified as a recording method, but the present invention is not limited thereto, and for example, another recording method such as an inkjet method may be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-215671, filed Dec. 21, 2023, which is hereby incorporated by reference herein in its entirety.

What is claimed is:

1. A cartridge mountable on an image forming apparatus, comprising:

a first unit; and a second unit including a first electrical component, a second electrical component, a first cable portion electrically connected to the first electrical component such that power is supplied from the image forming apparatus to the first electrical component, a second cable portion electrically connected to the second electrical component such that power is supplied from the image forming apparatus to the second electrical component, a first member including a first holding portion that holds the first electrical component and a first guide portion that guides the first cable portion, and a second member including a second holding portion that holds the second electrical component and a second guide portion that guides the second cable portion, the second unit being mountable on the first unit, wherein in a state that the second unit is mounted on the first unit, the first member is mounted on a first surface of the first unit, and the second member is mounted on a second surface intersecting the first surface of the first unit.

2. The cartridge according to claim 1, wherein in a state that the second unit is mounted on the first unit, the first member is mounted on an end portion of the first unit on an upstream side in a mounting direction in which the cartridge is mounted on the image forming apparatus, and the second member is mounted on the end portion of the first unit on the upstream side in the mounting direction.

3. The cartridge according to claim 1, wherein the second member is relatively movable with respect to the first member.

4. The cartridge according to claim 1, wherein the second unit further includes a shaft portion, the first member is rotatably supported by the shaft portion, and the second member is rotatably supported by the shaft portion.

5. The cartridge according to claim 1, wherein the second unit further includes a connector electrically connectable to an electrical connection portion of the image forming apparatus, the first cable portion is electrically connected to the first electrical component such that power is supplied from the electrical connection portion to the first electrical component via the connector, and the second cable portion is electrically connected to the second electrical component such that power is supplied from the electrical connection portion to the second electrical component via the connector.

6. The cartridge according to claim 5, wherein the first cable portion electrically connects the connector and the first electrical component, and the second cable portion electrically connects the first electrical component and the second electrical component.

7. The cartridge according to claim 1, wherein the first electrical component is a storage device that stores information regarding the cartridge.

8. The cartridge according to claim 1, further comprising a developing container that accommodates a developer, and a developer bearing member that bears the developer, wherein the first electrical component is a storage device that stores information regarding the cartridge, and the second electrical component is a toner density sensor that detects a toner density of the developer accommodated in the developing container.

9. The cartridge according to claim 1, further comprising a photosensor, wherein the first electrical component is a storage device that stores information regarding the cartridge, and the second electrical component is a light emitter that irradiates the photosensor with light.

10. A cartridge mountable on an image forming apparatus, comprising:

a first unit; and a second unit including a first electrical component, a second electrical component, a first cable portion electrically connected to the first electrical component such that power is supplied from the image forming apparatus to the first electrical component, a second cable portion electrically connected to the second electrical component such that power is supplied from the image forming apparatus to the second electrical component, a first member including a first holding portion that holds the first electrical component, and a second member including a second holding portion that holds the second electrical component, the second member being relatively movable with respect to the first member, the second unit being mountable on the first unit, wherein in a state that the second unit is mounted on the first unit, the first member is mounted on a first surface of the first unit, and the second member is mounted on a second surface intersecting the first surface of the first unit.

11. The cartridge according to claim 10, wherein in a state that the second unit is mounted on the first unit, the first member is mounted on an end portion of the first unit on an upstream side in a mounting direction in which the cartridge is mounted on the image forming apparatus, and the second member is mounted on the end portion of the first unit on the upstream side in the mounting direction.

12. The cartridge according to claim 10, wherein the second unit further includes a shaft portion, the first member is rotatably supported by the shaft portion, and the second member is rotatably supported by the shaft portion.

13. The cartridge according to claim 10, wherein the second unit further includes a connector electrically connectable to an electrical connection portion of the image forming apparatus, the first cable portion is electrically connected to the first electrical component such that power is supplied from the electrical connection portion to the first electrical component via the connector, and the second cable portion is electrically connected to the second electrical component such that power is supplied from the electrical connection portion to the second electrical component via the connector.

14. The cartridge according to claim 13, wherein the first cable portion electrically connects the connector and the first electrical component, and the second cable portion electrically connects the first electrical component and the second electrical component.

15. The cartridge according to claim 10, wherein the first electrical component is a storage device that stores information regarding the cartridge.

16. The cartridge according to claim 10, further comprising a developing container that accommodates a developer, and a developer bearing member that bears the developer, wherein the first electrical component is a storage device that stores information regarding the cartridge, and the second electrical component is a toner density sensor that detects a toner density of the developer accommodated in the developing container.

17. The cartridge according to claim 10, further comprising a photosensor, wherein the first electrical component is a storage device that stores information regarding the cartridge, and the second electrical component is a light emitter that irradiates the photosensor with light.

* * * * *